US007796588B2

(12) United States Patent
Nakamura et al.

(10) Patent No.: US 7,796,588 B2
(45) Date of Patent: Sep. 14, 2010

(54) INFORMATION PROCESSING DEVICE, CONTROL METHOD THEREOF, AND PROGRAM

(75) Inventors: Tadahiro Nakamura, Yokohama (JP); Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1453 days.

(21) Appl. No.: 11/188,185

(22) Filed: Jul. 22, 2005

(65) Prior Publication Data
US 2006/0039373 A1 Feb. 23, 2006

(30) Foreign Application Priority Data
Jul. 27, 2004 (JP) ............................. 2004-218822
Jul. 28, 2004 (JP) ............................. 2004-220026

(51) Int. Cl.
*H04L 12/28* (2006.01)
(52) U.S. Cl. .................................................... 370/389
(58) Field of Classification Search ................. 370/389, 370/471, 401, 400, 392, 465, 437, 473, 475, 370/352, 354; 710/100; 709/202; 358/2.1
See application file for complete search history.

(56) References Cited

U.S. PATENT DOCUMENTS

| 5,937,148 | A  |   | 8/1999  | Okazawa |
| 6,009,485 | A  | * | 12/1999 | Hosotsubo ................. 710/100 |
| 6,081,663 | A  | * | 6/2000  | Takahashi et al. ............ 703/20 |
| 6,526,044 | B1 | * | 2/2003  | Cookmeyer et al. ......... 370/352 |
| 7,302,195 | B2 |   | 11/2007 | Kobayashi |

FOREIGN PATENT DOCUMENTS

| CN | 1506868 A | 6/2004 |
| JP | 08-137637 A | 5/1996 |
| JP | 2004-013662 A | 1/2004 |
| JP | 2004-199543 A | 7/2004 |
| JP | 2004-200871 A | 7/2004 |
| KR | 2004-0021522 | 3/2004 |
| WO | WO 03/071742 A1 | 8/2003 |

OTHER PUBLICATIONS

The above reference was cited in a Dec. 2, 2008 Japanese Office Action that issued in Japanese Patent Application 2004-218822.
The above listed foreign patent documents were cited in a Feb. 19, 2008 Japanese Office Action issued in the counterpart Japanese Patent Application No. 2004-220026.
The above references were cited in a Jun. 3, 2008 Japanese Final Office Action issued in the counterpart Japanese Patent Application 2004-220026.
Korean Notice of Allowance issued Nov. 7, 2007 in the counterpart Korean Patent Application 059887662.

\* cited by examiner

*Primary Examiner*—Chi H Pham
*Assistant Examiner*—Alexander Boakye
(74) *Attorney, Agent, or Firm*—Cowan, Liebowitz & Latman, P.C.

(57) ABSTRACT

An information processing device which can communicate with an image processing device on a network is characterized by comprising a search indication unit for issuing a search indication for searching the image processing device on the network, a first transmission unit for transmitting a request for changing a power saving state of the image processing device on the network to a normal state in response to the search indication issued by the search indication unit, a second transmission unit for transmitting a search request for searching the image processing device after the request was transmitted by the first transmission unit, and a designation unit for designating a transmission range of the request transmitted by the first transmission unit, and characterized in that the second transmission unit transmits the search request to the transmission range designated by the designation unit.

10 Claims, 29 Drawing Sheets

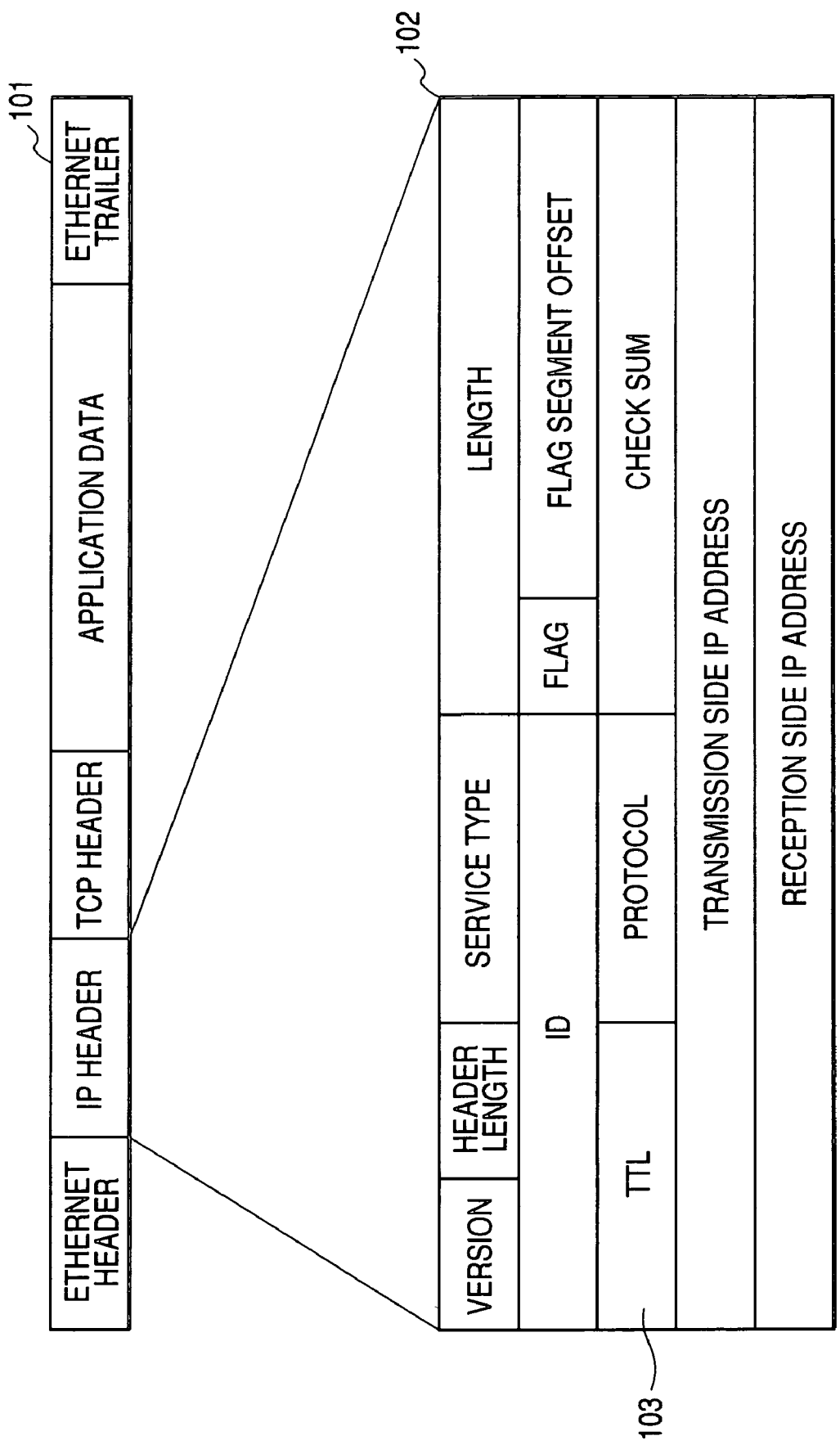

FIG. 2

| Service Location Header (function = SrvRqst = 1) ||
|---|---|
| length of <PRList> | PRList String |
| length of <service-type> | <service-type> String — 201 |
| length of <scope-list> | <scope-list> String — 202 |
| length of predicate string | Service Request <predicate> |
| length of <SLP SPI> string | <SLP SPI> String |

FIG. 3

| Service Location Header (function = SrvRply = 2) ||
|---|---|
| Error Code | URL Entry Count |
| <URL Entry 1> · · · · <URL Entry N> ||

FIG. 8

| NO. | MAC ADDRESS | IP ADDRESS |
|-----|-------------|------------|
| 1 | 000085111111 | 192.168.0.1 |
| 2 | 000085111112 | 192.168.1.2 |
| 3 | 000085111113 | 192.168.2.3 |

FIG. 9

| | |
|---|---|
| length of <PRList>: | 0x0000 |
| <PRList> String: | NULL |
| length of <service-type>: | 0x000c |
| <service-type> String: | "wakeup.AAA" |
| length of <scope-list>: | 0x0005 |
| <scope-list> String: | "AAA" |
| length of predicate string: | 0x0000 |
| Service Request <predicate>: | NULL |
| length of <SLP SPI> string: | 0x0000 |
| <SLP SPI> String: | NULL |

FIG. 10

| | |
|---|---|
| length of <PRList>: | 0x0000 |
| <PRList> String: | NULL |
| length of <service-type>: | 0x000a |
| <service-type> String: | "service:ws-discovery.AAA" |
| length of <scope-list>: | 0x0005 |
| <scope-list> String: | "AAA" |
| length of predicate string: | 0x0000 |
| Service Request <predicate>: | NULL |
| length of <SLP SPI> string: | 0x0000 |
| <SLP SPI> String: | NULL |

FIG. 11

URL Entry

| | |
|---|---|
| Error Code: | 0x0000 |
| URL Entry Count: | 0x0001 |
| Reserved: | 0x00 |
| Lifetime: | 0xffff |
| URL Length | 0x0031 |
| URL: | "service:ws-discovery.AAA:http://192.168.0.1/sds" |
| Num of URL auths: | 0x00 |

FIG. 12

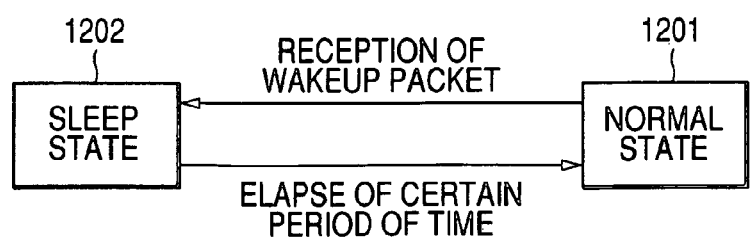

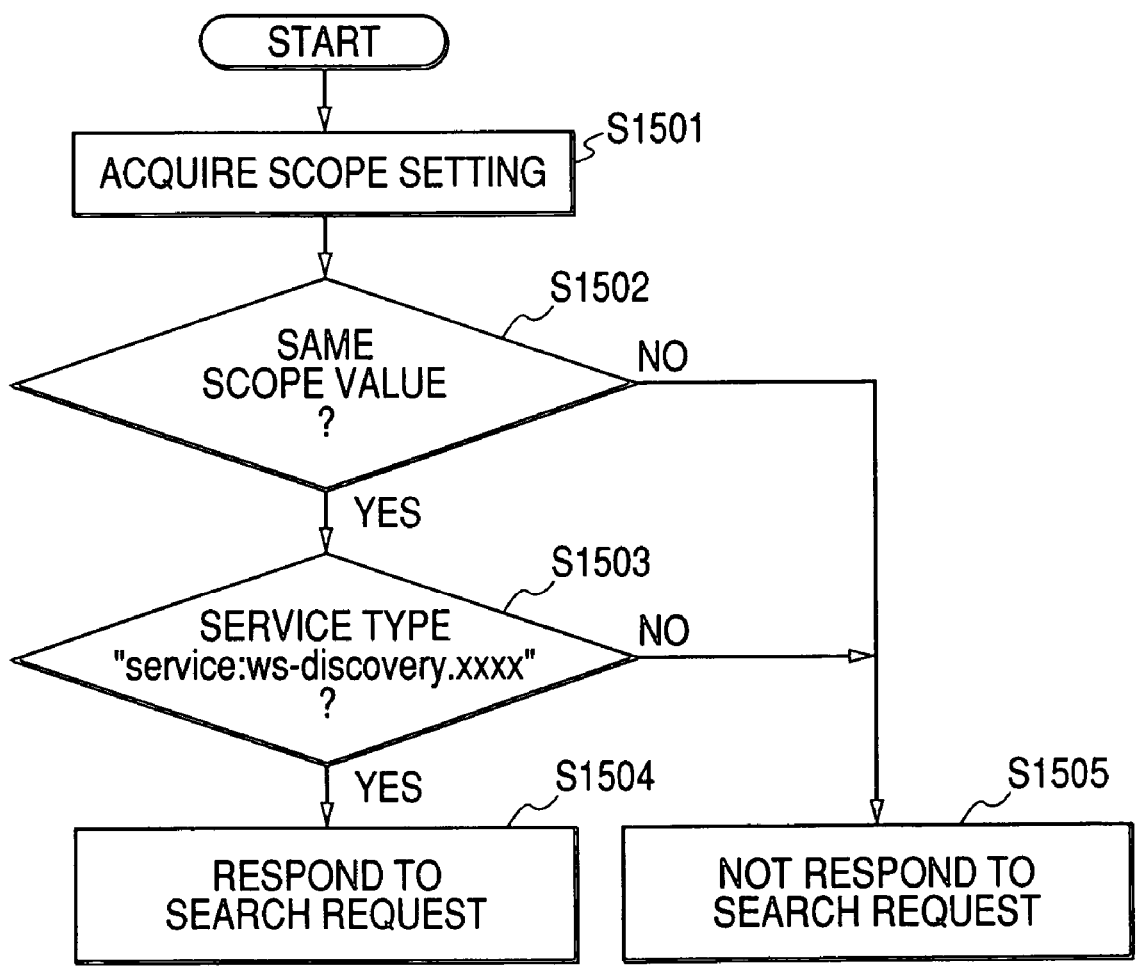

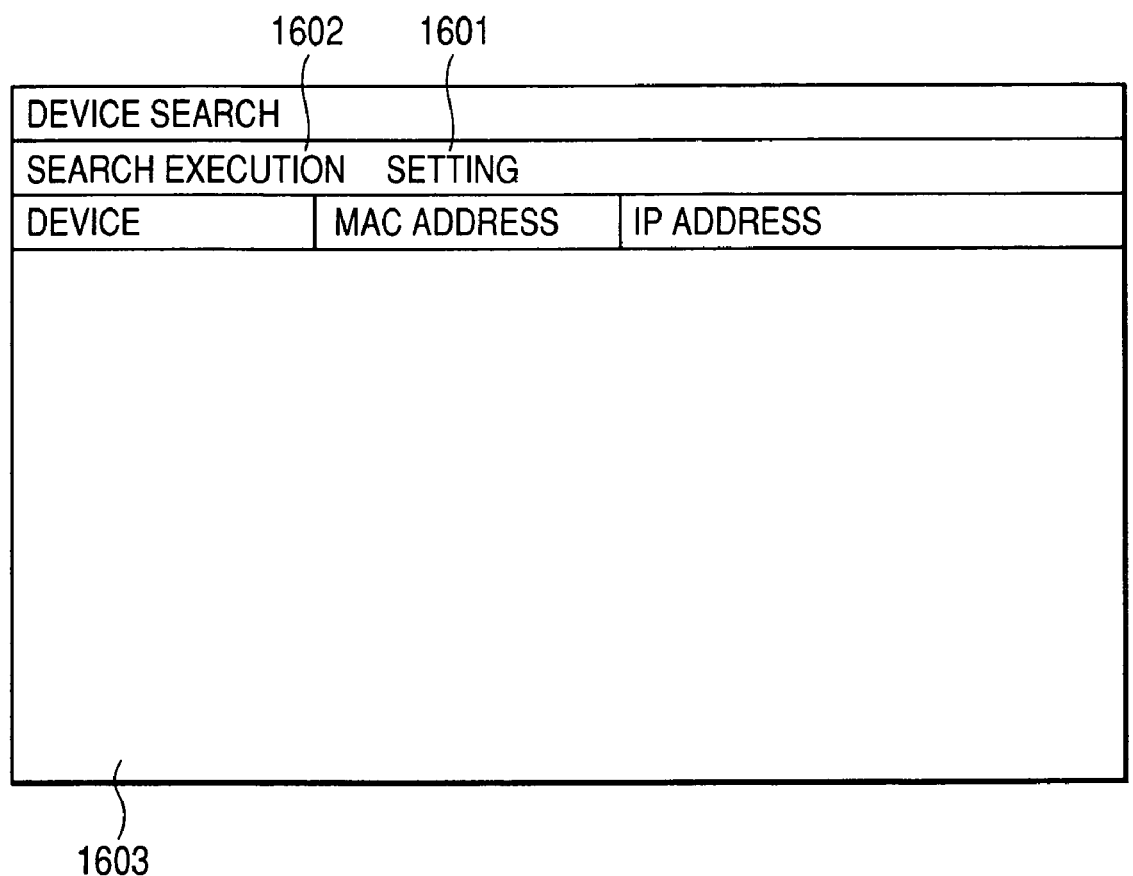

FIG. 18

| DEVICE SEARCH | | |
|---|---|---|
| SEARCH EXECUTION   SETTING | | |
| DEVICE | MAC ADDRESS | IP ADDRESS |
| DEVICE 1 | 000085111111 | 192.168.0.1 |

FIG. 19

| DEVICE SEARCH | | |
|---|---|---|
| SEARCH EXECUTION   SETTING | | |
| DEVICE | MAC ADDRESS | IP ADDRESS |
| DEVICE 1 | 000085111111 | 192.168.0.1 |
| DEVICE 2 | 000085111112 | 192.168.1.2 |

FIG. 21

| DEVICE SEARCH | | |
|---|---|---|
| SEARCH EXECUTION   SETTING | | |
| DEVICE | MAC ADDRESS | IP ADDRESS |
| DEVICE 1 | 000085111111 | 192.168.0.1 |

FIG. 22

| DEVICE SEARCH | | |
|---|---|---|
| SEARCH EXECUTION   SETTING | | |
| DEVICE | MAC ADDRESS | IP ADDRESS |
| DEVICE 1 | 000085111112 | 192.168.0.2 |
| DEVICE 2 | 000085111113 | 192.168.0.3 |

FIG. 30

| ITEM | VALUE (HEX) | LENGTH |
|---|---|---|
| Ether Frame | | |
| DESTINATION ETHERNET ADDRESS | ☆ 01:00:5e:7f:ff:fd | 6 |
| TRANSMISSION SIDE ETHERNET ADDRESS | DON'T CARE | 6 |
| FRAME TYPE | ☆ 0080 (IP) | 2 |
| IP FRAME | | |
| VERSION + DATA LENGTH | ☆ 45 | |
| TOS | DON'T CARE | 1 |
| DATA LENGTH | DON'T CARE | 2 |
| ID | DON'T CARE | 2 |
| FLAG | DON'T CARE | 2 |
| TTL | DON'T CARE | 1 |
| PROTOCOL ID | ☆ 11 (17) | 1 |
| CHECK SUM | DON'T CARE | 2 |
| RECEPTION SIDE IP ADDDRESS | DON'T CARE | 4 |
| DESTINATION IP ADDDRESS | ☆ 239.255.255.253 | 4 |
| UDP Frame | | |
| TRANSMISSION SIDE PORT NUMBER | DON'T CARE | 2 |
| DESTINATION PORT NUMBER | ☆ 1ab (427) | 2 |
| UDP DATA LENGTH | DON'T CARE | 2 |
| UDP CHECK SUM | DON'T CARE | 2 |
| SLP V2Frame | | |
| UNIQUE FRAME PATTERN | ☆ WAKEUP FROM DEEP SLEEP! | |

FIG. 34

SIMPLE SEARCH LIST

| NAME | LOCATION | MODEL |
|------|----------|-------|
| A | ○○○ | LBPXXX |
| B | ○○○ | LBPYYY |
| C | ○○○ | MFPZZZ |
| E | ××× | LBPXXX |
| F | ××× | LBPXXX |

SELECTION OF PRINTER    OK

WHOLE SEARCH    OK

FIG. 35

```
WHOLE SEARCH LIST

NAME        LOCATION       MODEL
    A           ○○○            LBPXXX
    B           ○○○            LBPYYY
    C           ○○○            MFPZZZ
    E           ×××            LBPXXX
    F           ×××            LBPXXX
    G           ○○○            MFPTTT
    H           ×××            LBPXXX

SELECTION OF PRINTER      [  OK   ]
                                   [ CANCEL ]
```

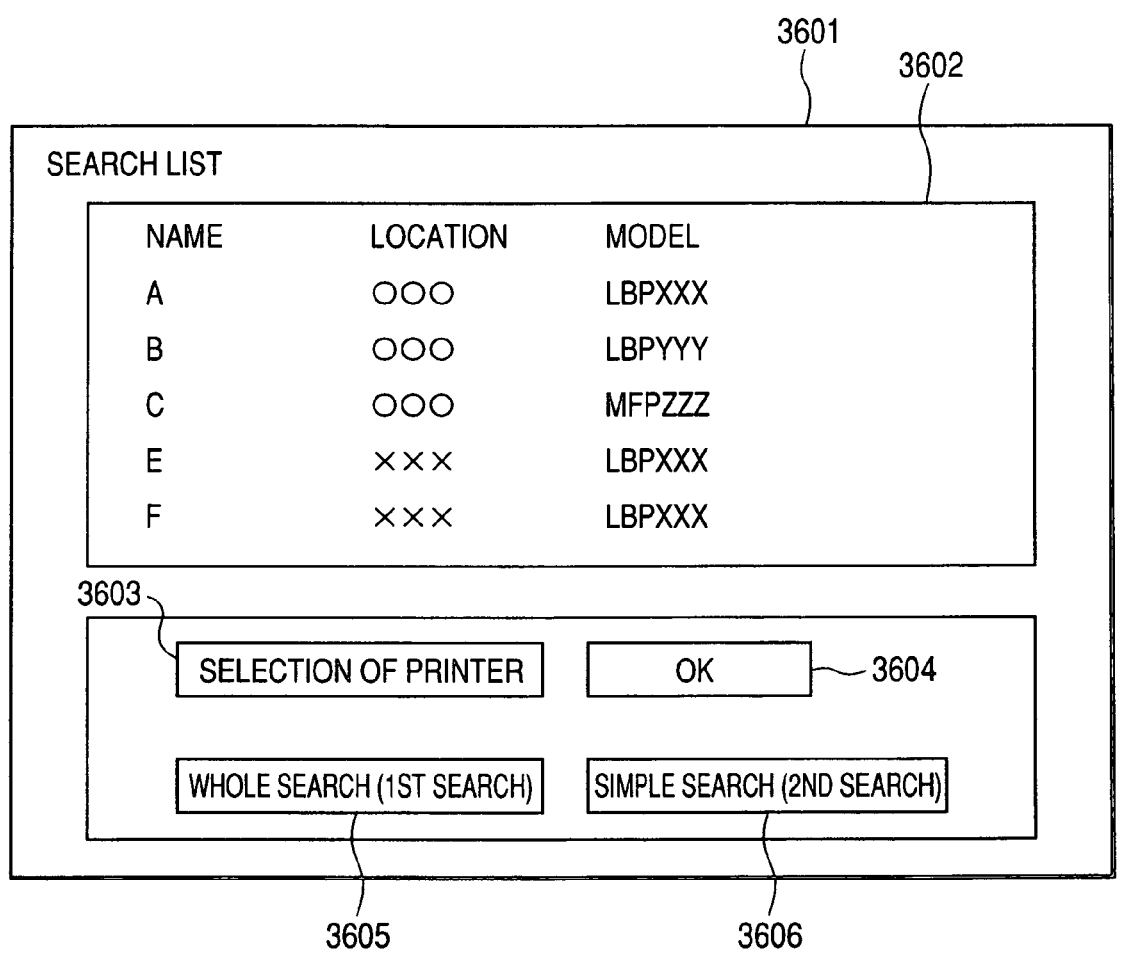

INFORMATION PROCESSING DEVICE, CONTROL METHOD THEREOF, AND PROGRAM

BACKGROUND OF THE INVENTION

1. Field of the Invention

The present invention relates to an information processing device which acts as a network device search device for searching a device on a network, a control method which is applied to the information processing device, and a program which causes the information processing device to operate.

2. Related Background Art

Conventionally, network devices such as a printer, a multifunctional machine and the like which are connected to a network and can be operated from a computer through the network are generally used. Based on this, various management software which is used to easily use these network devices is developed. Here, it should be noted that the relevant management software provides various functions, for managing the network device, such as the function for searching the device, the function for setting a network address, the device for controlling the device, and the like.

Incidentally, by the management software, there are various systems of searching the device on the network. Here, one of these systems, a so-called broadcast system can be used.

More specifically, in the broadcast system, the management software broadcasts a search request packet for the device through the network, the device which received the search request packet sends a search response to the management software, whereby the presence of the target device is searched. Incidentally, although the relevant broadcast system can be easily implemented, a broadcast packet cannot often pass the router which connects the adjacent networks mutually. This is because a network manager generally sets the router not to execute the routing for the broadcast packet so as to control unnecessary network traffic. As a result, in case of searching the device according to the broadcast system, there is a problem that the searchable range is reluctantly narrowed within an identical subnet.

For this reason, a device search system which uses multicasting instead of the broadcasting is developed. Here, in the multicasting, as well as the broadcasting, it is possible to simultaneously transmit data to plural destinations. However, the multicasting is different from the broadcasting in the point that, by transmitting the data to a specific address dedicated for the multicasting, the relevant data can be transmitted only to a node which prepares data reception from the multicast address. According to such a characteristic of the multicasting, packet routing by the router is often permitted with respect to a multicast packet. Incidentally, it is generally determined according to the following rule whether nor not to transfer the packet received by the router to another network.

FIG. 1 is a diagram showing the constitution of a packet. That is, a TCP/IP (Transmission Control Protocol/Internet Protocol) packet has the constitution as indicated by numeral 101 in FIG. 1, and, in the TCP/IP packet 101, an IP header portion 102 has a TTL (Time To Live) region 103. Although an initial value of the TTL value (i.e., the value of the TTL region) is set to the TTL region 103 by the transmission side, the router which received the TCP/IP packet 101 decreases its TTL value one by one, and then transfers the received packet to another network. At that time, when the TTL value of the received packet is equal to or less than "1", the router discards the relevant packet without transferring it. By doing so, it is assured that the situation which keeps transferring an unnecessary packet eternally does not occur. According to the above rule, the packet transmission side can control the range that the packet reaches, by appropriately setting the TTL value of the packet that the packet transmission side itself first transmits.

Incidentally, the SLP (Service Location Protocol) defined by the RFC (Request For Comments) 2608 is the protocol which enables to search a service on the network by using the multicasting. FIG. 2 is a diagram showing the packet constitution of the Service Request (function=1) which is the command for searching the service in the SLP, and FIG. 3 is a diagram showing the packet constitution of the Service Reply (function=2) which is the command for causing the service which received the Service Request to transmit a response.

According to the packet constitution as shown in FIG. 2, the transmission side generates the search request packet in which a type 201 and a scope 202 of the service intended to be searched are described, and then transmits the generated search request packet by using the multicasting. Subsequently, the node which received the search request packet on the network analyzes the contents thereof. Here, if it is analyzed that the node conforms to the search condition indicated by the received search request packet, the relevant node transmits the response with the packet constitution shown in FIG. 3. Meanwhile, if it is analyzed that the node does not conform to the search condition, the relevant node discards the received search request packet.

Incidentally, the improvement for controlling (or suppressing) the power consumption in such a network device as above currently advances with the object of energy saving. In particular, in the device such as a printer, a copying machine or the like of which the power consumption is high because it executes image fixation by using heat, it is thought that how power consumption is low contributes to popularize the relevant products including the network device itself. Ordinarily, if the state that the device is not operated or handled by a user for a certain period of time continues, or if the state that communication between the device and another device or a computer is not executed for a certain period of time continues, the relevant device comes to be in a sleep mode (that is, a power saving mode). Then, in the sleep mode, power is fed only to the hardware such as a one-chip microcomputer, a LAN (local area network) controller and the like of which the power consumption is low so as to maintain the bare essentials of the functions. In other words, the relevant device controls the power consumption by stopping unnecessary power feeding. Moreover, the relevant device can restart all the functions in response to a user's operation (or handling). In addition, the relevant device can restart all the functions also when the packet of a specific data format is received from the network. Incidentally, it should be noted that "sleep mode" may be equivalent to "sleep state" throughout the specification and the drawings.

However, since the above network device has the sleep mode as described above, the following problem occurs when the management software searches the device. That is, in the case where the device is in the sleep mode, even if the device search request is transmitted by the management software, no response is returned because the device does not returns to its normal state, whereby it is resultingly impossible to search the device.

SUMMARY OF THE INVENTION

The present invention has been brought to completion in consideration of the above conventional problem, and an object of the present invention is to, even if a device is in the sleep state, effectively search the relevant device.

To achieve the above object, the present invention is characterized by an information processing device which can communicate with an image processing device on a network, comprising:

a search indication unit adapted to issue a search indication for searching the image processing device on the network;

a first transmission unit adapted to transmit a request for releasing from a power saving state of the image processing device on the network to a normal state;

a second transmission unit adapted to transmit a search request for searching the image processing device, after the request was transmitted by the first transmission unit; and a designation unit adapted to designate a transmission range of the search request transmitted by the second transmission unit, wherein the first transmission unit transmits the search request to a transmission range which includes the transmission range designated by the designation unit at least.

Further, the present invention is characterized by an information processing device which can communicate with an image processing device on a network, comprising:

a first transmission unit adapted to transmit a request for changing a power saving state of the image processing device on the network to a normal state;

a second transmission unit adapted to transmit a search request for searching the image processing device;

a selection unit adapted to select either one of a first search method of transmitting the search request by the second transmission unit after transmitting the request by the first transmission unit, and a second method of transmitting the search request by the second transmission unit without transmitting the request by the first transmission unit; and a control unit adapted to control the first transmission unit or the second transmission unit on the basis of the search method selected by the selection unit.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the invention and, together with the description, serve to explain the principles of the invention.

FIG. 1 is a diagram showing the packet constitution typically used in the related background art;

FIG. 2 is a diagram showing the packet constitution of the Service Request command in the SLP;

FIG. 3 is a diagram showing the packet constitution of the Service Reply in the SLP;

FIG. 8 is a diagram showing an example of the device list generated by the device search device according to the present invention;

FIG. 9 is a diagram showing an example of a wakeup packet according to the present invention;

FIG. 10 is a diagram showing an example of a search request packet according to the present invention;

FIG. 11 is a diagram showing an example of a search response packet according to the present invention;

FIG. 12 is a diagram showing a change of the state of the device according to the present invention;

FIG. 15 is a flow chart showing the search response judgment process in the device according to the present invention;

FIG. 16 is a diagram showing an example of the search screen based on the device search software according to the present invention;

FIG. 17 is a diagram showing an example of the search screen based on the device search software according to the present invention;

FIG. 18 is a diagram showing an example of the search-executed device list according to the first embodiment;

FIG. 19 is a diagram showing an example of the search-executed device list according to the first embodiment;

FIG. 21 is a diagram showing an example of the search-executed device list according to the second embodiment;

FIG. 22 is a diagram showing an example of the search-executed device list according to the second embodiment;

FIG. 30 is a diagram for explaining the SLP multicast packet which is an example of the data pattern which includes the communication information to be transmitted to an unspecified device or plural specified devices and the identifiers to be used to control the power source, according to the third embodiment;

FIG. 34 is a diagram showing a display example of the list of simple search according to the third embodiment;

FIG. 35 is a diagram showing a display example of the list of whole search according to the third embodiment; and FIG. 36 is a diagram showing another display example of the list of searching according to the third embodiment.

DETAILED DESCRIPTION OF THE PREFERRED EMBODIMENTS

First Embodiment

Hereinafter, the first embodiment of the present invention will be explained with reference to the attached drawings.

Figure 4:
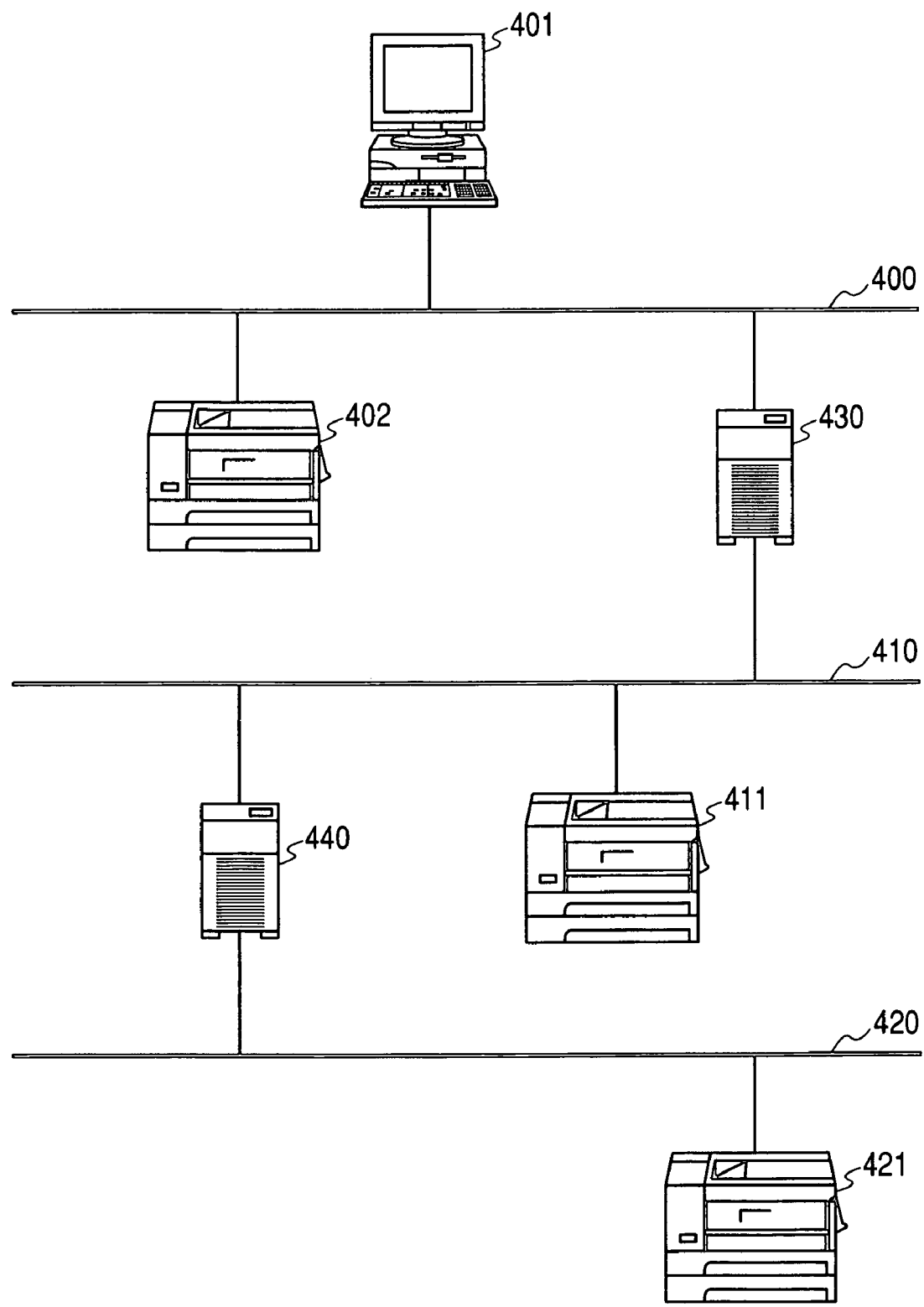
FIG. 4 is a block diagram showing a network device search system according to the first embodiment of the present invention.

FIG. 4 is a block diagram showing a network device search system according to the first embodiment of the present invention. In FIG. 4, three LAN's 400, 410 and 420 are mutually connected through routers 430 and 440. More specifically, a computer device 401 and a device 402 are together connected to the LAN 400, a device 411 is connected to the LAN 410, and a device 421 is connected to the LAN 420. Here, it should be noted that the above device is the image processing device such as a printer, a copying machine, a facsimile machine, a scanner, a multifunctional machine or the like.

Figure 5:
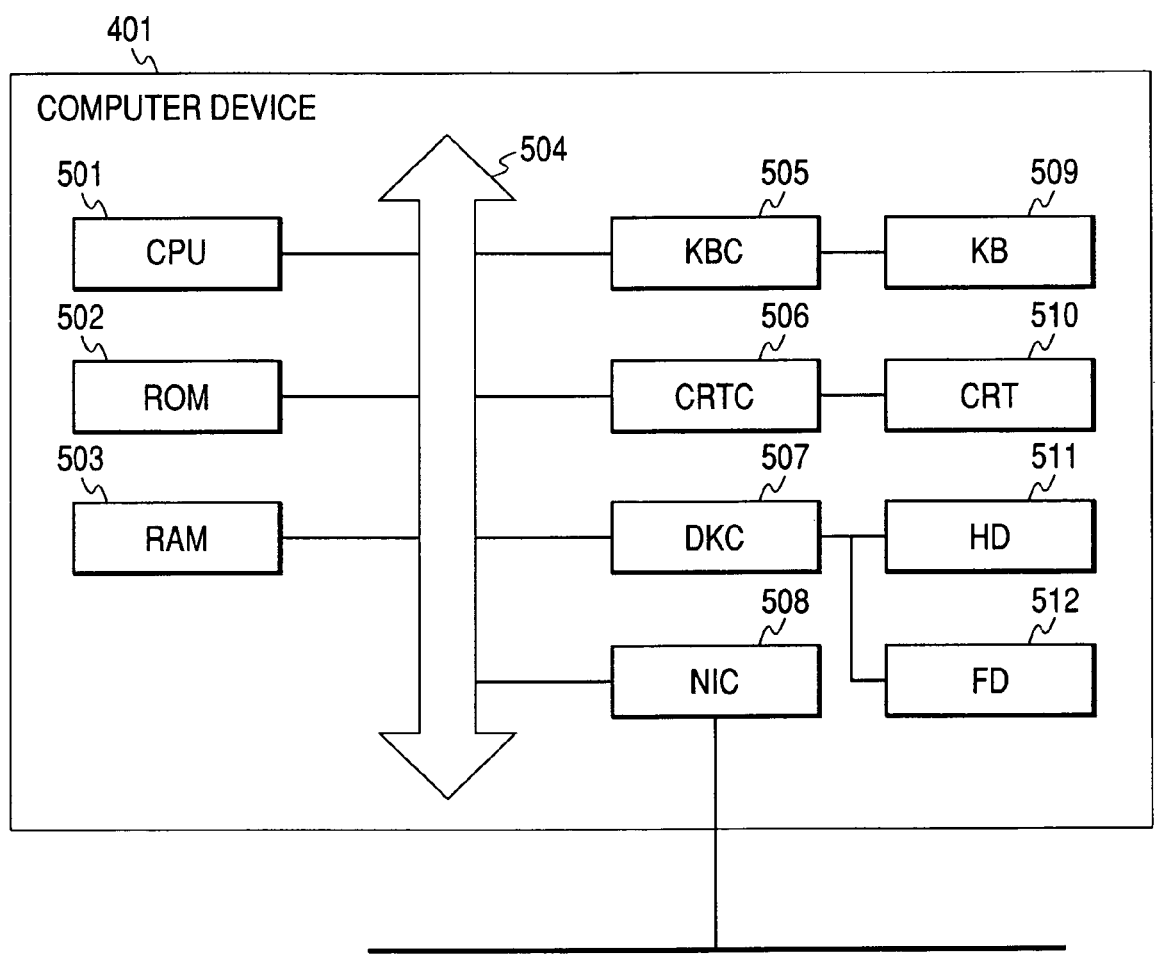
FIG. 5 is a block diagram showing the device search device.

FIG. 5 is a block diagram showing an example of the constitution of the computer device 401 which can be used as the network device search device according to the present invention. Here, it should be noted that the network device search device according to the present invention can be achieved by the computer device equivalent to a conventional multi-purpose computer.

In FIG. 5, an HD (hard disk) 511 stores therein the program for causing the computer device 410 to function as the network device search device according to the present embodiment. In the following explanation, unless otherwise noted, the network device search device executes the process mainly by a CPU 501, and the software is controlled mainly by network device search software stored in the HD 511. Besides, in FIG. 5, numeral 502 denotes a ROM, numeral 503 denotes a RAM, numeral 505 denotes a KBC (keyboard controller), numeral 509 denotes a KB (keyboard), numeral 506 denotes a CRTC (CRT controller), numeral 510 denotes a CRT, numeral 507 denotes a DKC (disk controller), numeral 512 denotes an FD (flexible disk or Floppy™ disk), numeral 508 denotes an NIC (network interface controller) 508, and numeral 504 denotes a bus.

Figure 6:
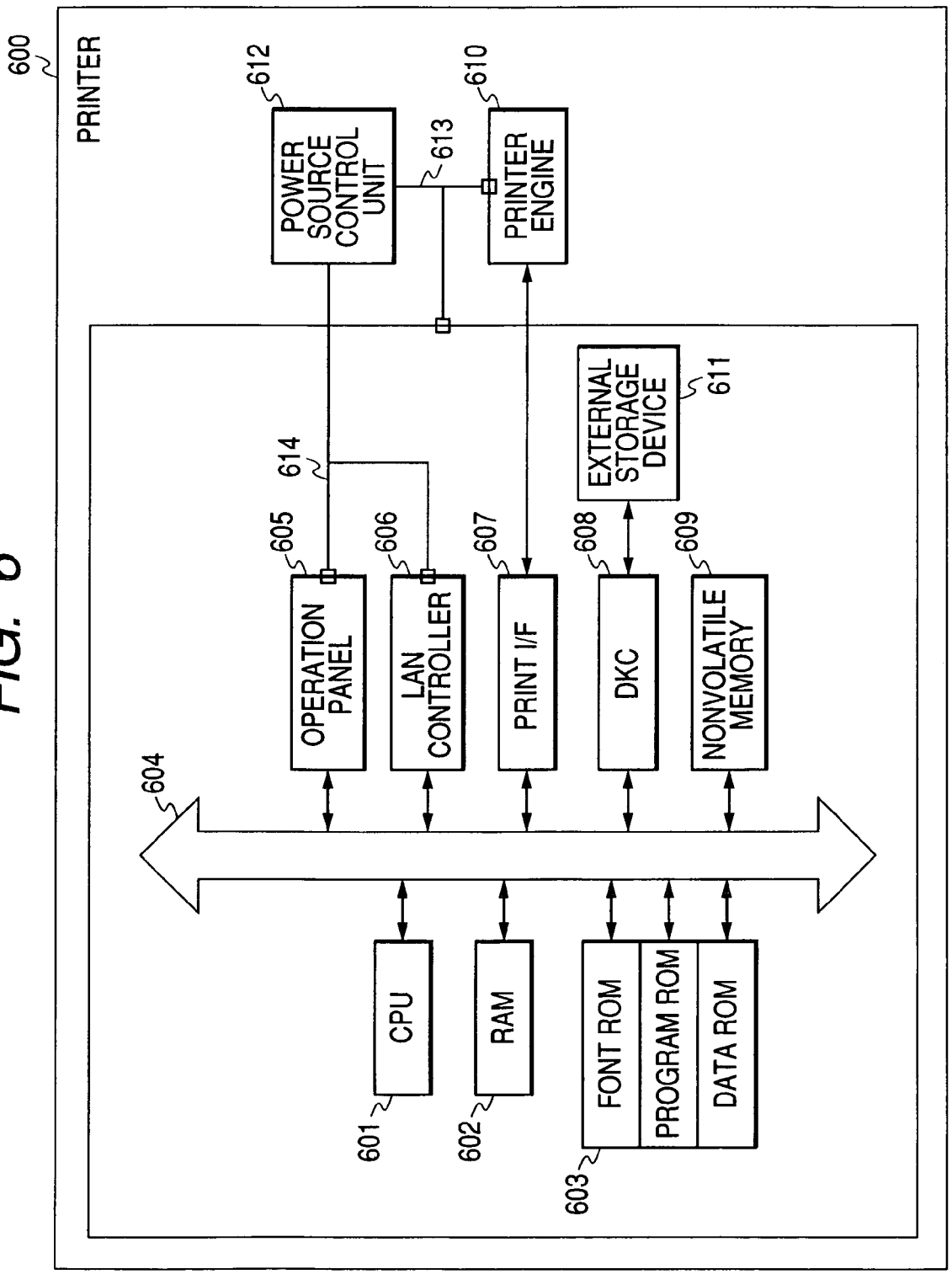
FIG. 6 is a block diagram showing the network device.

FIG. 6 is a block diagram for explaining the hardware constitution of the network device. Hereinafter, it should be noted that the network device will be explained by way of example. That is, in a printer 600 of FIG. 6, a CPU (printer CPU) 601 totally controls the accessing to various devices connected through a system bus 604 on the basis of the control program stored in a program ROM 603, and then output an image signal as the output information to a printer engine (print unit) 610 connected through a print I/F (interface) 607. Moreover, a control program and the like which can be executed by the CPU 601 are stored in the program ROM 603. Besides, font data (including outline font data) and the like which are used to generate the output information are stored in a font ROM 603, and the information and the like which are used on a host computer are stored in a data ROM 603. The CPU 601 can execute the communication process with the host computer on the network through a LAN controller 606. Incidentally, a RAM 602 mainly functions as the main memory and the working area for the CPU 601, and the memory capacity of the RAM 602 can be expanded by an option RAM connected to a not-shown expansion port. Also, the RAM 602 can be used as an output information extraction region, an environment data storage region and the like. A DKC (disk controller) 608 controls the accessing to an external storage device 611 such as an HD (hard disk), an IC card and the like. The HD stores therein font data, an emulation program, form data and the like. Besides, the HD is also used as the job storage region which temporarily spools a print job to be externally controlled. Numeral 605 denotes an operation panel by which a user can input various information through the software keys arranged thereon. Incidentally, it should be noted that the number of the external storage devices is not limited to one, that is, two or more external storage devices may be provided. More specifically, it is possible to connect, to the printer 600, the plural font cards which provide various fonts in addition to the built-in fonts, and the plural external memories each of which holds the program for interpreting a printer control language of different language system. Numeral 609 denotes a nonvolatile memory which stores printer mode setting information input from the operation panel 605 with respect to each user and/or each group.

Although not shown in the drawing, the printer 600 can be optionally equipped with various expansion devices such as a finisher of executing a stapling function and a sorting function, a double-sided printing device of executing a double-sided printing function, and the like. Here, it should be noted that the CPU 601 also controls the operations of these expansion devices.

A power source control unit 612 which controls power feeding to each unit disposed in the printer 600 is equipped with two kinds of power source control lines, that is, one is a line 614 which is connected to the LAN controller 606 and the operation panel 605, and the other is a line 613 which is connected to the printer controller and the printer engine 610. In this connection, when the standby state of the printer 600 continues for a certain period of time and thus the CPU 601 indicates to come into the sleep mode, the power feeding on the line 613 is stopped, whereby only the LAN controller 606, the operation panel 605 and the power source control unit 612 which are all connected to the line 614 can operate. Moreover, a specific data pattern can be registered in the LAN controller 606. Thus, when a packet including the relevant data pattern is received from the network, the power source control unit 612 is indicated to restart the power feeding to the line 613 so as to return the printer 600 to its normal state. When the CPU 601 starts to execute the control program, it also executes the data pattern registration process with respect to the LAN controller 606. Here, it should be noted that, as described later, a part of the data pattern to be registered can be set by the user. In any case, in the following explanation, the packet which includes the specific data pattern to return the sleep state of the device to the normal state is called a wakeup packet as a matter of convenience.

Figure 7:
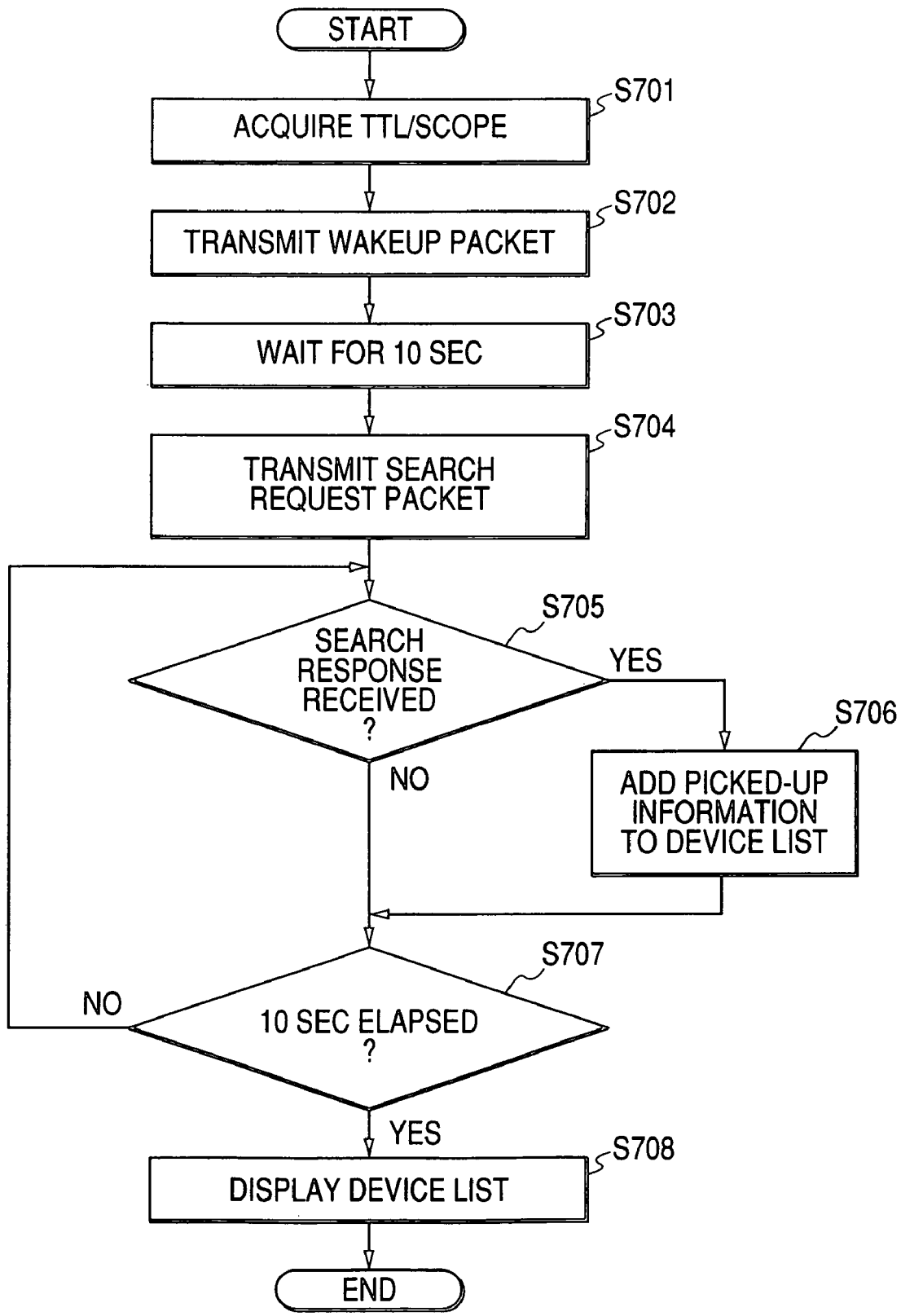
FIG. 7 is a flow chart showing the process of device search software according to the present invention.

FIG. 7 is a flow chart showing the process according to the network device search software.

When it is indicated to search the network device, the TTL (Time To Live) value and a SCOPE value which are input and set by a user through the search setting screen shown in FIG. 17 and used in the transmission packet are acquired in a step S701. Then, in a step S702, the wakeup packet to change the sleep state of the device to the normal state is transmitted by using multicasting, and, at that time, the TTL value acquired in the step S701 is set to the wakeup packet, and "AAA" is always set to the SCOPE value. Incidentally, the format of the wakeup packet will be described later with reference to FIG. 9.

After then, in a step S703, it waits for a certain period of time, e.g., 10 seconds, until the sleep state of the device changes to the normal state. Here, it is of course possible by the user to freely change the relative period of time.

Next, in a step S704, the search request packet is transmitted by using the multicasting. At that time, the TTL value and the SCOPE value acquired in the step S701 are set in the search request packet. Incidentally, the format of the search request packet will be described later with reference to FIG. 10. Subsequently, in a step S705, it is judged whether or not a search response is received from the device. Incidentally, the format of the search response packet will be described later with reference to FIG. 11. If it is judged that the search response is received from the device, the flow advances to a step S706 to pick up the device information such as the MAC (media access control) address, the IP (Internet Protocol) address and the like of the relevant device from the received search response, and add the picked-up information to a device list. Subsequently, the flow advances to a step S707. Here, it should be noted that the device list is as shown in FIG. 8 in which the device information responsive to the search request is held in the form of a list. Incidentally, when it is judged in the step S705 that the search response is not received from the device, the flow similarly advances to the step S707. In the step S707, it is judged whether or not a predetermined period of time elapses from the transmission of the search request packet in the step S704. In that case, for example, it is judged whether or not ten seconds elapses. However, it is of course possible by the user to arbitrarily change the value of the predetermined period of time. Incidentally, if it is judged in the step S707 that the predetermined period of time does not elapse, the flow returns to the step S705. Meanwhile, if it is judged in the step S707 that the predetermined period of time elapses, the flow advances to a step S708 to display the formed device list, and thereafter the process ends. Incidentally, in the flow chart of FIG. 7, the search request packet is transmitted after the predetermined period of time elapsed from the transmission of the wakeup packet. However, the wakeup packet and the search request packet can be transmitted together as one packet.

FIG. 9 shows an example of the wakeup packet which is transmitted in the step S702 of FIG. 7. In FIG. 9, the wakeup packet designates "wakeup.AAA" as the service type according to the SLP (Service Location Protocol) format. Thus, if the LAN controller 606 of the device receives the relevant SLP packet which designates "wakeup.AAA" as the service type, its sleep state returns to the normal state. That is, the present embodiment shows the case where "wakeup.AAA" is registered as the specific data patter in the LAN controller 606 of the device.

FIG. 10 shows an example of the search request packet which is transmitted in the step S704 of FIG. 7. In FIG. 10, the search request packet designates "service:ws-discovery.AAA" as the service type to be searched and "AAA" as the SCOPE value according to the SLP format.

FIG. 11 shows an example of the search response packet which is received in the step S705 of FIG. 7. In FIG. 11 the search response packet returns the URL Entry which includes the information such as the accessing URL and the like, according to the SLP format.

FIG. 12 is a diagram showing a change of the state of the device. In a normal state 1201, if the situation that any operation is not executed by the user continues for a certain period of time continues, or if the situation that any communication to another device or computer is not executed for a certain period of time continues, the relevant state is changed to a sleep state 1202. In the sleep state 1202, if the operation (handling) is executed by the user, or if the wakeup packet is received from the network, the relevant state is changed to the normal state 1202.

Figure 13:
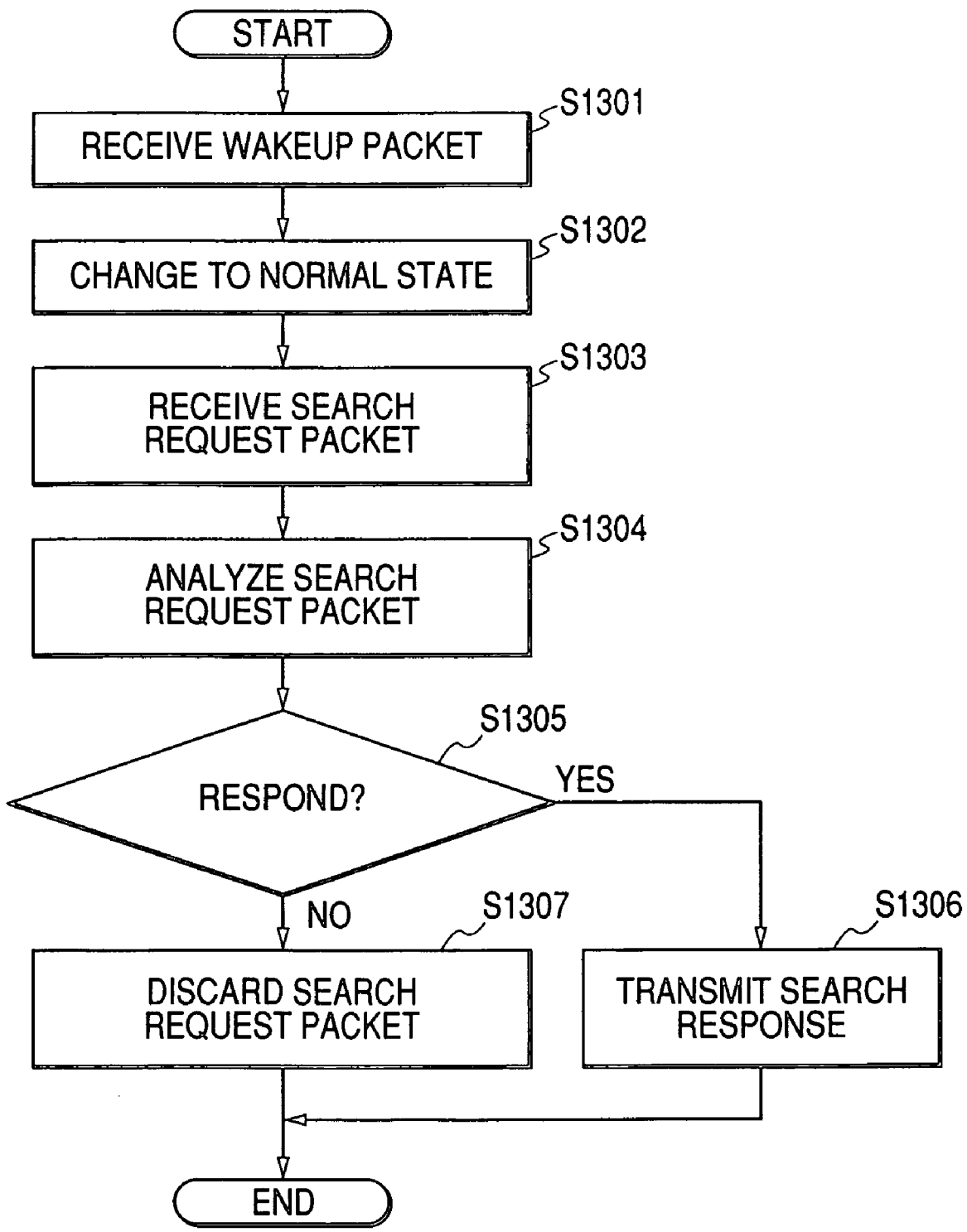
FIG. 13 is a flow chart showing the process of the device in the sleep state according to the present invention.

FIG. 13 is a flow chart showing the process of the device to be executed in the sleep state. That is, in a step S1301, if the wakeup packet as shown in FIG. 9 transmitted from the network is received by the device in the sleep state, the flow advances to a step S1302. In the step S1302, the sleep state of the device is changed to the normal state (or normal mode). Then, if the search request packet as shown in FIG. 10 is received in a step S1303, the flow advances to a step S1304 to analyze the received packet. Subsequently, in a step S1305, it is judged whether or not to respond to the search request. Then, if it is judged to respond to the search request, the flow advances to a step S1306 to transmit the search response as shown in FIG. 11, and the process ends. Meanwhile, if it is judged not to respond to the search request, the flow advances to a step S1307 to discard the received search request packet, and the process ends. Incidentally, whether or not to respond to the search request will be explained in detail with reference to FIG. 15.

Figure 14:
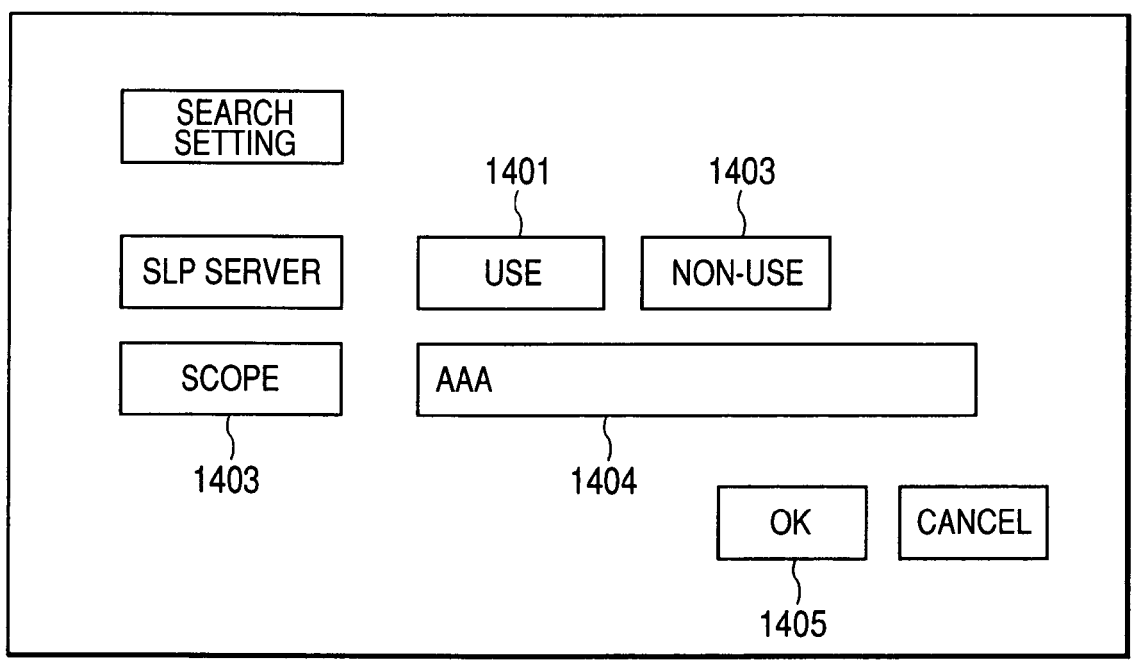
FIG. 14 is a diagram showing an example of the screen for setting device search according to the present invention.

FIG. 14 is a diagram showing an example of the screen for setting the device search on the operation panel 605.

More specifically, in FIG. 14, whether or not to execute the SLP response on the device is determined by selecting either a buttons 1401 or a button 1402. Here, when the SLP response is executed, it is possible to also execute the SCOPE setting to which the device belongs. That is, when a button 1403 is depressed, a software keyboard (not shown) is displayed so that the SCOPE information can be input by the user. Then, the input information is displayed in a region 1404. FIG. 14 shows the example that "AAA" is input as the SCOPE value. Here, the items set on this screen are stored in the nonvolatile memory 609 by depressing a button 1405. Incidentally, in the present embodiment, the SCOPE value set on this screen is used only for the judgment process shown in FIG. 15, that is, the SCOPE value does not influence the registration of the data pattern to the LAN controller 606.

FIG. 15 is the flow chart showing in detail the search response judgment process in the step S1305 of FIG. 13.

Initially, in a step S1501, the SCOPE value set on the screen shown in FIG. 14 is acquired. Next, in a step S1502, it is judged whether or not the SCOPE value designated by the received search request packet is the same as the SCOPE value acquired in the step S1501. If it is judged that the SCOPE value designated by the received search request packet is the same as the SCOPE value acquired in the step S1501, the flow advances to a step S1503 to further judge whether or not the service type designated by the received search request packet is "service:ws-discovery.AAA". If it is judged that the service type designated by the received search request packet is "service:ws-discovery.AAA", it is judged to respond to the search request (step S1504). Meanwhile, if it is judged in the step S1502 that the SCOPE value designated by the received search request packet is not the same as the SCOPE value acquired in the step S1501, it is judged to not respond to the search request (step S1505). In addition, if it is judged that the service type designated by the received search request packet is not "service:ws-discovery.AAA", it is also judged to not respond to the search request (step S1505).

Subsequently, the operation to be executed in the device search on the network shown in FIG. 4 will be explained. In that case, it is assumed that all of the devices 402, 411 and 421 are in the sleep state.

FIG. 16 is a diagram showing an example of the search screen which is displayed on the device search device (computer device) 401 based on the device search software. On the search screen shown in FIG. 16, the search setting is executed by depressing a setting button 1601, and the search is actually executed according to the flow chart of FIG. 7 when an execution button 1602 is depressed. Then, the device list which is generated as the result of the search process is displayed in a region 1603. More specifically, when the setting button 1601 is depressed by a user, the search setting screen as shown in FIG. 17 is displayed, and the TTL value and the SCOPE value are thus input on the displayed search setting screen by the user.

In FIG. 17, if "1" is input as the TTL value to execute the search, then "1" is set as the TTL value in each of the wakeup packet and the search request packet. Thus, the wakeup packet transmitted from the network device search device (computer device) 401 is received by the router 430, but the received wakeup packet is not transferred to the LAN 410 because the TTL value is "1". As a result, only the device 402 on the LAN 400 receives the wakeup packet, whereby its sleep state is changed to the normal state. On the other hand, the devices 411 and 421 are still in the sleep mode because they do not receive any wakeup packet.

Subsequently, the search request packet transmitted from the network device search device 401 is not also transferred from the router 430 to the LAN 410 because the TTL value thereof is "1". Thus, only the device 402 on the LAN 400 receives the search request packet, and returns the search response to the network device search device 401. As a result, the network device search device 401 can accordingly search one device, and thus displays the device list as shown in FIG. 18.

Next, in FIG. 17, if "2" is input as the TTL value to execute the search, then "2" is set as the TTL value in each of the wakeup packet and the search request packet. Thus, the wakeup packet transmitted from the network device search device 401 is received by the router 430, "1" is subtracted from the TTL value of the received wakeup packet by the router 430, and then the acquired wakeup packet is transferred to the LAN 410. Moreover, the wakeup packet transferred to the LAN 410 is received by the router 440, but the received wakeup packet is not transferred to the LAN 420 because the TTL value thereof is "1". As a result, each of the device 402 on the LAN 400 and the device 411 on the LAN 410 receives the wakeup packet, whereby their sleep state is changed to the normal state. On the other hand, the device 421 is still in the sleep mode because it does not receive any wakeup packet. Next, also the TTL value of the search request packet transmitted from the network device search device 401 is "2", whereby this packet is transferred to the LAN 410 by the router 430 but is not transferred to the LAN 420 by the router 440. Thus, each of the device 402 on the LAN 400 and the device 411 on the LAN 410 receives the search request packet, and returns the search response to the network device search device 401. As a result, the network device search device 401 can accordingly search two device, and thus displays the device list as shown in FIG. 19.

Second Embodiment

Subsequently, the second embodiment of the present invention will be explained hereinafter.

It should be noted that the basic constitution in the second embodiment is the same as that in the first embodiment, whereby only the points different from the first embodiment will be explained hereinafter. That is, in the first embodiment, the sleep mode of the device is retuned to the normal mode by always using "AAA" as the SCOPE value of the wakeup packet. However, in the present embodiment, the SCOPE value is made variable so as to enable fine search control as compared with the search control in the first embodiment.

Figure 20:
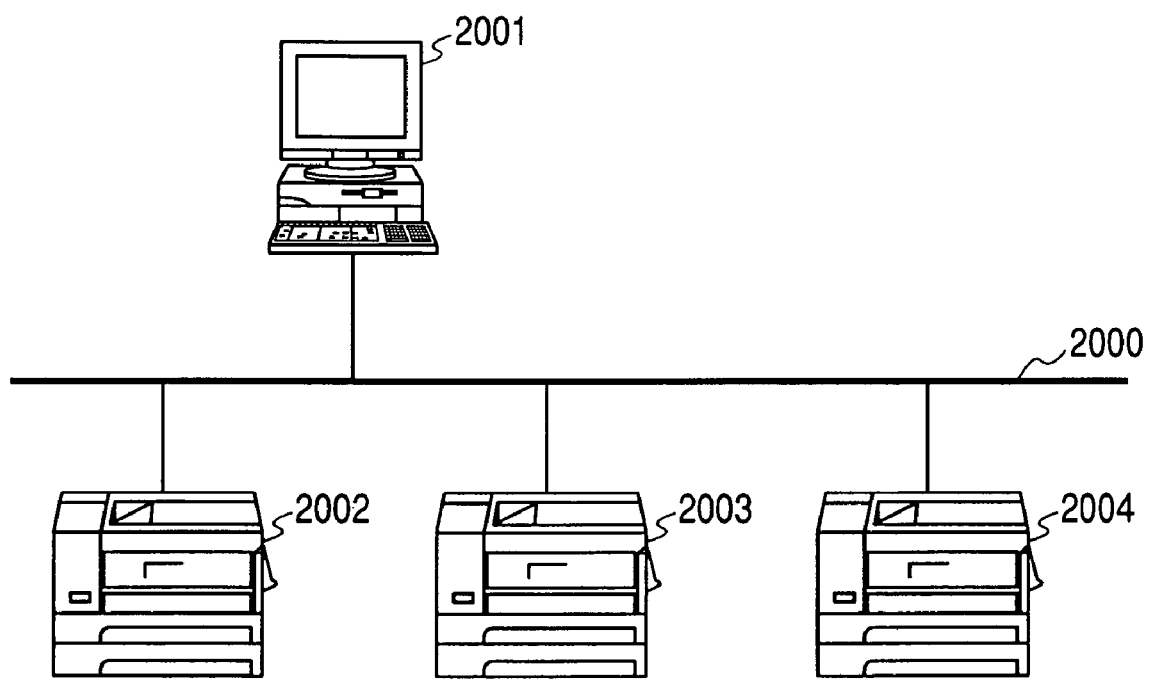
FIG. 20 is a block diagram showing a network device search system according to the second embodiment of the present invention.

FIG. 20 is a block diagram showing a constitutional example of a network device search system according to the second embodiment of the present invention. In FIG. 20, a search device 2001 and devices 2002, 2003 and 2004 are mutually connected on a LAN 2000. Here, in the present embodiment, although the plural LAN's can be mutually connected through the respective routers as well as the first embodiment, the system which is simplified as much as possible will be explained so as to clarify the difference from first embodiment.

The search software running on the search device 2001 basically executes the process as shown in FIG. 7. However, the SCOPE value acquired in the step S701 is set to the wakeup packet to be transmitted in the step S702.

Moreover, in the search setting to be executed on the operation panel as shown in FIG. 14, the SCOPE value set by the user is also used to the registration of the data pattern to the LAN controller 606. As a result, to change the sleep state of the device to the normal state, it is necessary to transmit the wakeup packet having the value same as the SCOPE value set here.

Subsequently, the device search operation to be executed by the user on the network shown in FIG. 20 will be explained hereinafter. Incidentally, in the actual device search, it is assumed that the devices 2002, 2003 and 2004 are all in the sleep state. Moreover, it is assumed that "Floor1" is set as the SCOPE value to the device 2002 and "Floor2" is set as the SCOPE value respectively to the devices 2003 and 2004 in the method as shown in FIG. 14.

When the user inputs "Floor1" as the SCOPE value on the screen shown in FIG. 17 to execute the device search, "Floor1" is set as the SCOPE value respectively to the wakeup packet and the search request packet in the search process shown in the flow chart of FIG. 7. Thus, the wakeup packet transmitted from the search device 2001 is received by all the devices 2002, 2003 and 2004. In that case, only the device 2002 to which "Floor1" has been set comes to be in the normal state, but the remaining devices 2003 and 2004 are still in the sleep mode. That is, the specific data pattern in the first embodiment by which the device in the sleep state returns to the normal state is the SLP packet to which "wakeup.AAA" has been registered, but the specific data pattern in the second embodiment is the SLP packet to which "wakeup.AAA" has been registered and the SCOPE value same as the SCOPE value registered in the device has been registered as the SCOPE value.

Subsequently, the search request packet transmitted from the search device 2001 is received only by the device 2002 being in the normal state, and the search response is transmitted from the device 2002 to the search device 2001. As a result, the search device 2001 can accordingly search one device, and thus displays the device list as shown in FIG. 21.

Next, when the user inputs "Floor2" as the SCOPE value on the screen shown in FIG. 17 to execute the device search, "Floor2" is set as the SCOPE value respectively to the wakeup packet and the search request packet in the search process shown in the flow chart of FIG. 7. Thus, the wakeup packet transmitted from the search device 2001 is received by all the devices 2002, 2003 and 2004. In that case, the devices 2003 and 2004 to which "Floor2" has been set as the SCOPE value of the device come to be in the normal state, but the remaining device 2002 is still in the sleep mode. Then, the search request packet transmitted from the search device 2001 is received by the devices 2003 and 2004 being in the normal state, and the search response is transmitted from each of the devices 2003 and 2004 to the search device 2001. As a result, the search device 2001 can accordingly search two devices, and thus displays the device list as shown in FIG. 22.

Incidentally, in the above first and second embodiments, the conventional computer device as shown in FIG. 5 is used as the search device. However, the present invention is not limited to this. That is, for example, it is of course possible for a device such as a copying machine or the like having the operation panel to store the search software in its ROM and then actually search another device by its CPU executing the stored software.

Third Embodiment

Subsequently, the third embodiment of the present invention will be explained hereinafter.)

In the above first and second embodiments, the sleep state of the device is explained as the unique state. However, it is thought that the sleep state of one device is divided into the plural levels and the divided levels are managed and controlled. In other words, the device which has the plural sleep states according to the levels for interrupting power supply or power feeding can be provided. In the present embodiment, it should be noted that the plural sleep states are classified into two according to their levels, that is, deep sleep and light sleep. In any case, the contents of the sleep states of each of the deep sleep and the light sleep will be explained later.

In the present embodiment, the method of more effectively executing the device search in a case where the computer searches the device having the two kinds of sleep states, that is, the deep sleep and the light sleep, will be explained.

Figure 23:
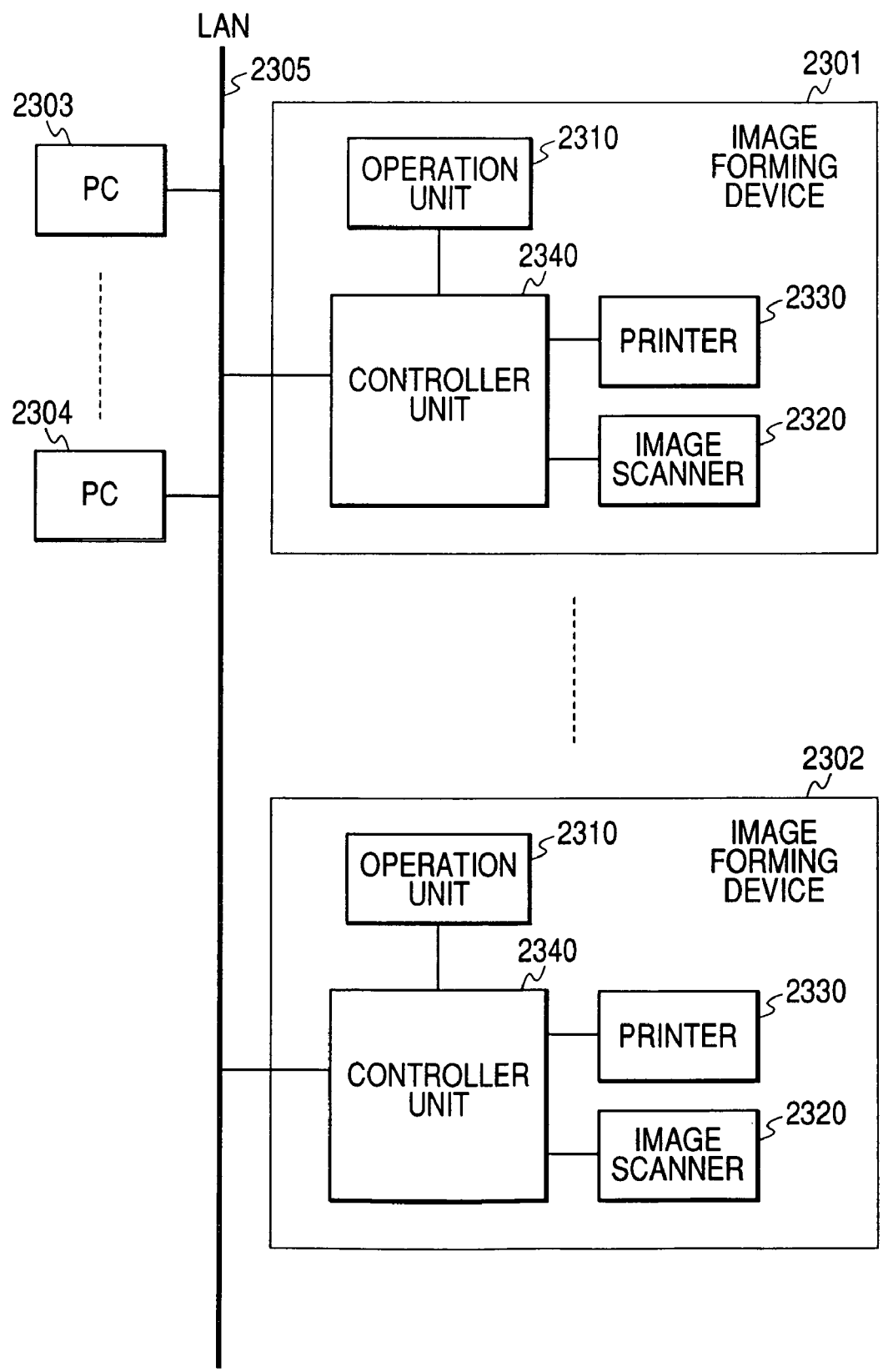
FIG. 23 is a block diagram showing the constitution of a network system according to the third embodiment of the present invention.

FIG. 23 is a block diagram showing the constitution of a network system according to the third embodiment of the present invention. In FIG. 23, each of numerals 2301 and 2302 denotes and image forming device such as a digital copying machine or the like which is equivalent to the print device in the present invention, and each of the image forming devices 2301 and 2302 mainly has the image output function. Each of numerals 2303 and 2304 denotes a PC (personal computer) which functions as a host computer equivalent to the information processing device in the present invention. Here, it should be noted that the image forming devices 2301 and 2302 and the PC's 2303 and 2304 are mutually connected through a LAN 2305.

In each of the image forming devices 2301 and 2302, numeral 2310 denotes an operation unit by which a user executes various operations and handlings, numeral 2320 denotes an image scanner which is used to read various image information in response to the indication transferred from the operation unit 2310, and numeral 2330 denotes a printer which prints the image information on a paper. Moreover, numeral 2340 denotes a controller unit which controls outputting of the image information to the image scanner 2320 and the printer 2330 in response to the indications transferred from the operation unit 2310 and the PC's 2303 and 2304.

For example, if print data acting as the image information is transmitted from the PC 2303 or 2304 to the image forming device 2301 or 2302 through the LAN 2305, the transmitted print data can be actually printed out (image output) by the printer 2330.

Figure 24:
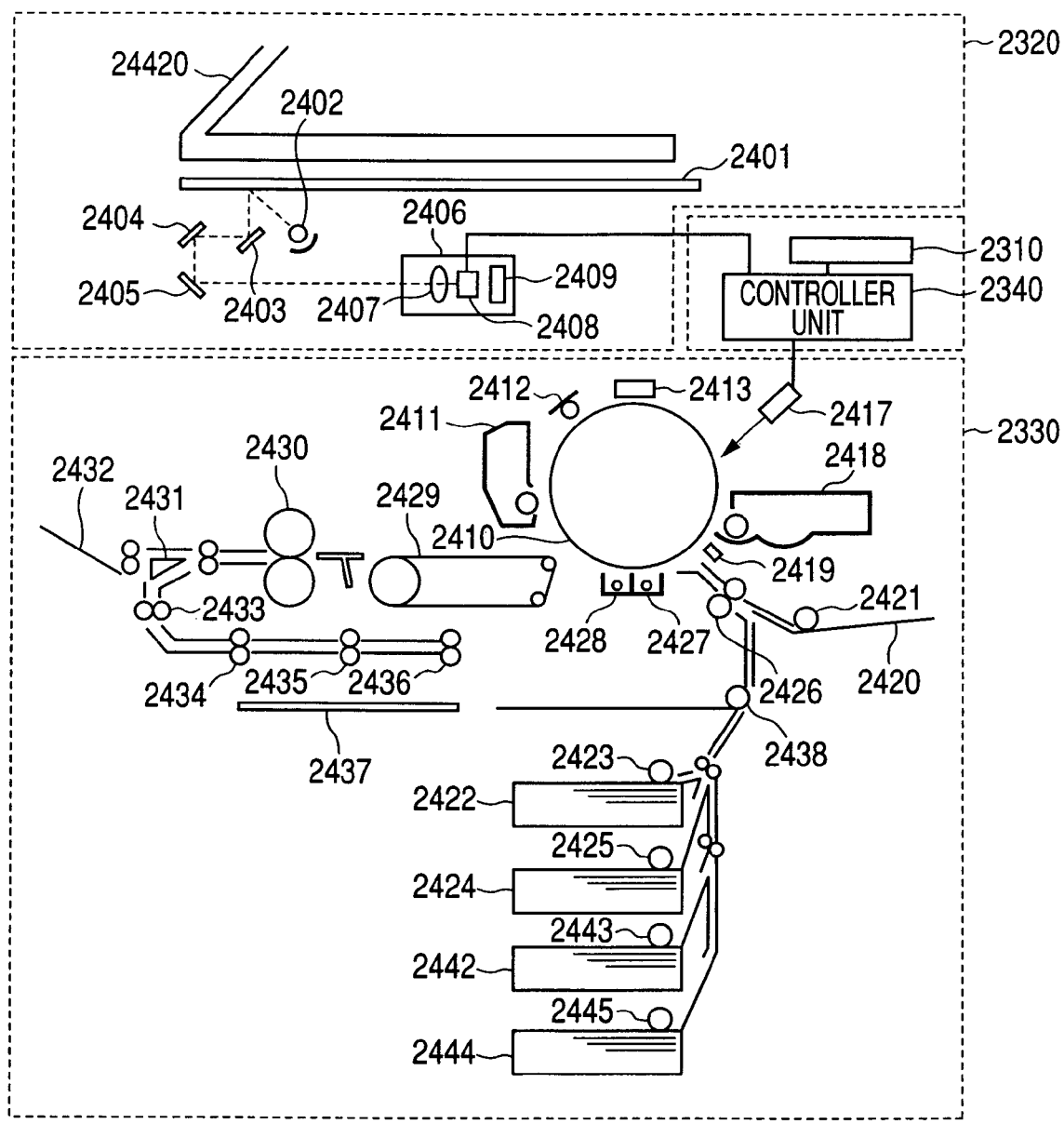
FIG. 24 is a block diagram showing an example of the constitution of an image forming device according to the third embodiment.

FIG. 24 is a block diagram showing an example of the constitution of each of the image forming devices 2301 and 2302. It should be noted that, in FIG. 24, the constitutional elements which are equivalent to those shown in FIG. 23 are denoted by the corresponding same numerals respectively. Numeral 2401 denotes an original glass plate on which the originals fed from an automatic document feeder 24420 are sequentially put on one by one at the predetermined position, and numeral 2404 denotes an original illumination lamp which consists of, for example, a halogen lamp and illuminates the original put on the original glass plate 2401.

Numerals 2403, 2404 and 2405 respectively denote scanning mirrors which are held in a not-shown optical scanning unit. The scanning mirrors 2403, 2404 and 2405 together reciprocate to guide the reflection light from the original to a CCD unit 2406. The CCD unit 2406 consists of an imaging lens 2407 for forming an image on an image pickup element 2408 on the basis of the reflection light from the original, the image pickup element 2408 composed of, for example, a CCD, a CCD driver 2409 for driving the image pickup element 2408, and the like. Here, the image signal output from the image pickup element 2408 is transformed into, e.g., eight-bit digital data, and then input to the controller unit 2340.

Numeral 2410 denotes a photosensitive drum of which the electricity is eliminated by a pre-exposure lamp 2412 for preparation of the image formation. Then, the photosensitive drum 2410 is uniformly electrical-charged by a primary charger 2413. Numeral 2417 denotes an exposure unit which comprises, for example, a semiconductor laser or the like. The exposure unit 2417 exposes the photosensitive drum 2410 to form an electrostatic latent image thereon in response to the image data processed by the controller unit 2340.

Numeral 2418 denotes a developing unit which holds therein a black developer (toner), and numeral 2419 denotes a pre-transfer charger which applies high voltage to the photosensitive drum 2410 before the toner image developed on the photosensitive drum 2410 is transferred to the paper. Numerals 2422, 2424, 2442 and 2444 respectively denote paper feeding units, and numeral 2420 denotes a manual paper feeding unit. More specifically, the transfer paper is fed into the device by the driving of paper feeding rollers 2421, 2423, 2425, 2443 and 2445, the fed paper is once stopped at the position where a registration roller 2426 is disposed, and then the once-stopped paper is re-fed in exact timing with the start of the image formation on the photosensitive drum 2410.

Numeral 2427 denotes a transfer charger which transfers the toner image developed on the photosensitive drum 2410 onto the fed transfer paper, and numeral 2428 denotes a separation charger which separates the transfer paper to which the transfer operation ended from the photosensitive drum 2410. Then, the toner which is not transferred and thus remains on the photosensitive drum 2410 is retrieved by a cleaner 2411.

Numeral 2429 denotes a transportation belt which is used to transport the transfer paper to which the transfer operation ended to a fixing unit 2430. In the fixing unit 2430, the developed image is fixed to the transfer paper by, for example, heat and pressure. Numeral 2431 denotes a flapper which is used to controllably guide the transportation path for the transfer paper, to which the transfer operation ended, toward either a sorter 2432 or an intermediate tray 2437. Numeral 2433 to 2436 respectively denote feeding rollers which are used to feed the transfer paper, to which the fixing operation once ended, as inverting it (in case of multi-copying) or not inverting it (in case of double-sided copying). Numeral 2438 denotes a re-feeding roller which is used to feed and transport the transfer paper put on the intermediate tray 2437 again to the position where the registration roller 2426 is disposed.

Figure 25:
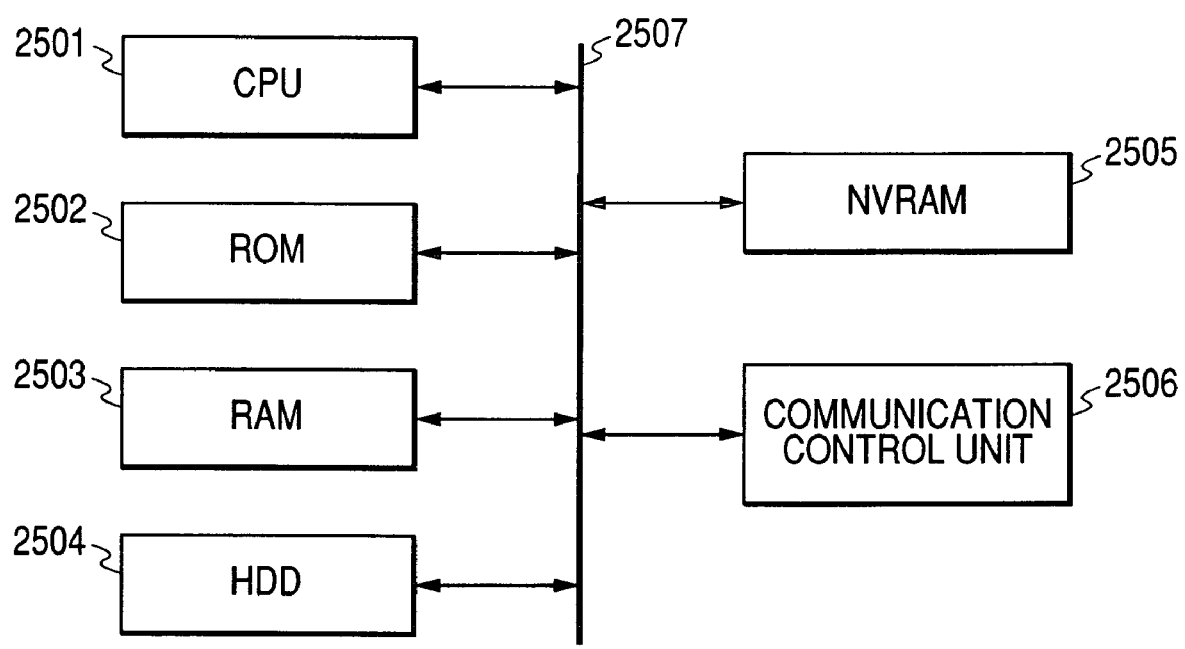
FIG. 25 is a block diagram showing an example of the constitution of an image processing device according to the third embodiment.

FIG. 25 is a block diagram showing the hardware constitution of each of the PC's 2303 and 2304. In FIG. 25, numeral 2502 denotes a CPU, numeral 2502 denotes a ROM which stores therein various programs such as a boot program and the like, numeral 2503 denotes a RAM which is used as the operation area when the application is executed, numeral 2504 denotes an HDD (hard disk drive) which acts as the nonvolatile storage unit for storing the applications and the processed data, numeral 2505 denotes an NVRAM (nonvolatile RAM) which stores therein the basic setting information and the like, and numeral 2506 denotes a communication control unit. Here, it should be noted that these the constitutional elements are mutually connected through a bus 2507.

Figure 26:
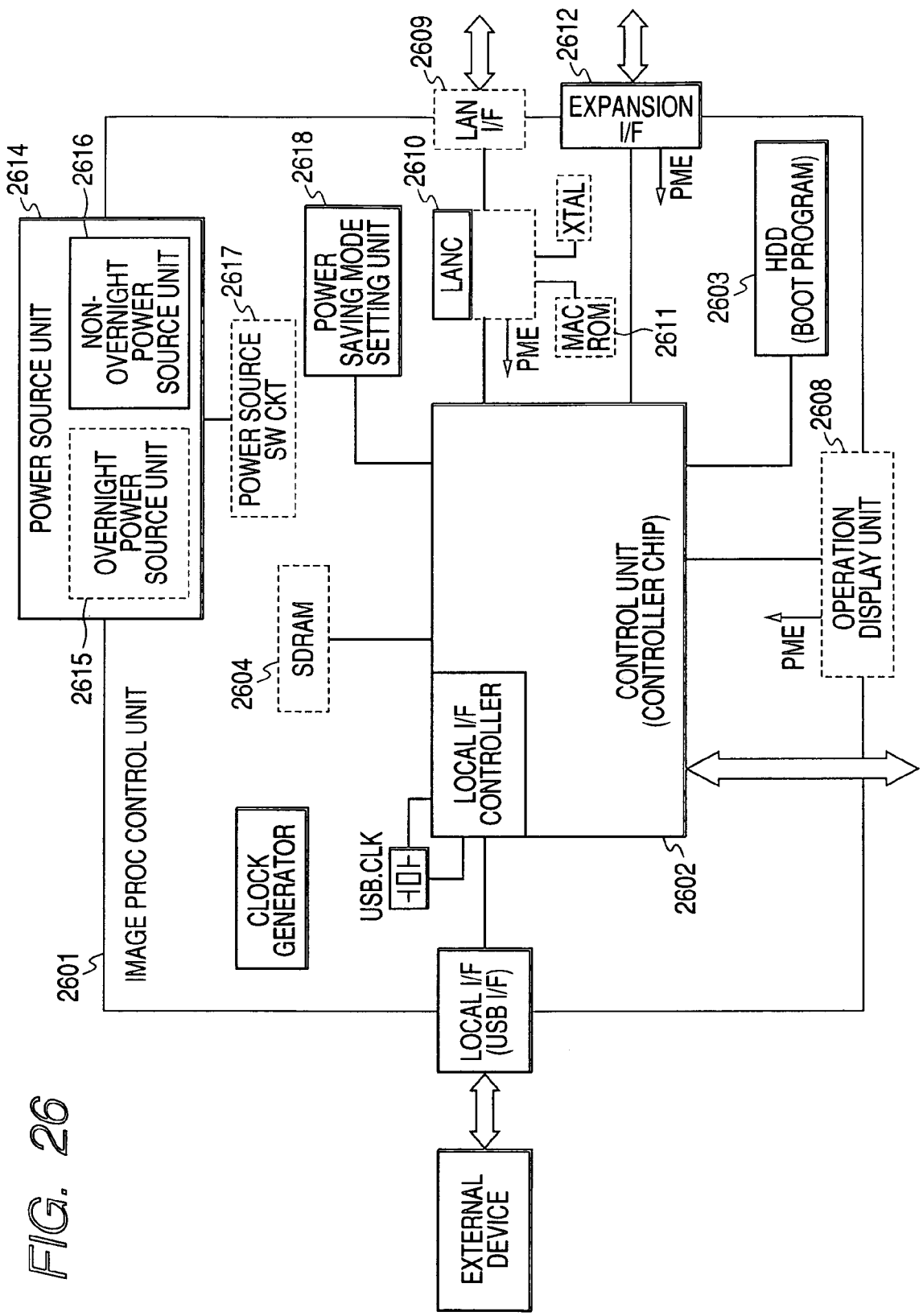
FIG. 26 is a block diagram showing an example of the hardware constitution of the controller unit of the image forming device according to the third embodiment.

FIG. 26 is a block diagram showing the hardware constitution of the controller unit 2340 of each of the image forming devices 2301 and 2302. In particular, it should be noted that the relevant hardware constitution returns, even in the later-described deep sleep state, the device to the power feeding state so as to be able to respond to the various requests transmitted from an external device. In FIG. 26, an image processing control unit 2601 which is included in the controller unit 2340 comprises a one-chip control unit (controller chip) 2602. Here, the control unit 2602 consists of a ROM I/F (interface) for a not-shown ROM storing various programs, a RAM I/F for a RAM including a DRAM (dynamic RAM), a PCI (Peripheral Component Interconnect) bus I/F, a video I/F, hardware for extracting print description languages transferred from the external devices, an ASIC (application specific integrated circuit) including compression/extraction functions for various data, and the like. Besides, the control unit 2602 has the function for executing the image process to the print data received from the external device through a network or an LANC (LAN controller) 2610, and the function for receiving and processing the data given through the LANC 2610.

An HDD (hard disk drive) 2603 is the nonvolatile storage means which continues to store the data even if the main power source is not turned on. Incidentally, the HDD 2603 stores therein the initialization programs for the respective constitutional elements of the image processing control unit 2601, the initial setting values (parameters) for image processing, communications, displaying and the like, and the programs for defining the various operations such as image processing, communications, displaying and the like. In the present embodiment, the data which concerns the initialization and is stored in the HDD 2603 is often called initialization data or setting data. If the main power source of the image forming device 2301 (or 2302) is turned on, it starts to execute the boot program stored in the HDD 2603. Thus, the initialization programs, the initial setting values (parameters), the main programs and the like are read from the HDD 2603 by the respective units of the image processing control unit 2601 including the control unit 2602, whereby the initialization processes are executed.

An SDRAM (synchronous dynamic RAM) 2604 acts to temporarily store the print data extracted by the control unit 2602, and temporarily save the initialization data and the setting data read from the HDD 2603 in case of the initialization process, according as the device comes into the later-described deep sleep state. In any case, the saved initialization data and the saved setting data are again used by the respective constitutional elements of the image processing control unit 2601 when the device returns from the deep sleep state, whereby high-speed return can be achieved when the power source to the respective constitutional elements is again turned on. Incidentally, in addition to the SDRAM, it is possible to use a DDR-SDRAM (double data rate SDRAM), an SRAM (static RAM), or the like. Generally, the data reading/writing speed of the volatile storage means is higher than that of the nonvolatile storage means such as a hard disk, an EEPROM (electronically erasable and programmable ROM), a flash memory or the like, whereby it is desirable to use the volatile storage means rather than the nonvolatile storage means. In particular, if the data size of the program is large, it is often necessary to store the relevant program in the hard disk because of the limitation of data size in the ROM. In such a case, a high-speed process is specifically effective.

Hereinafter, the deep sleep in the present embodiment will be explained. If the image processing control unit 2601 does not receive an interruption signal for a certain period of time after starting the timer, it is controlled by the image processing control unit 2601 to feed overnight power from the power source unit 2614 to, from among the functional blocks disposed in the image processing control unit 2601, a minimum of functional blocks necessary to receive and process the print data from the external devices and return from the state incapable of responding to a status request (that is, for example, the SDRAM 2604, an operation display unit 2608, an expansion I/F 2612, the LANC 2610, a network I/F (LAN I/F) 2609; a power source SW (switching) circuit 2617, and the like are included in these functional blocks). Moreover, it is further controlled by the image processing control unit 2601 not to feed power to other functional blocks from among the functional blocks disposed in the image processing control unit 2601.

The overnight power is fed to the operation display unit 2608, whereby, through the operation display unit 2608, the user can confirm the status (or state) of the image forming device including the image processing control unit 2601 and change the settings concerning the various image processes. Then, according to the operation to the operation display unit 2608, a start signal (shown as PME (power management event) in FIG. 26) for returning the image processing control unit 2601 from the deep sleep state is generated. Here, it should be noted that this operation will be later described in detail. The PME is used for the indication to turn on the power source of the system, and can be received by the system which is equipped with a PCI2.2-compliant bus. However, the present invention is not limited to the PME, that is, it is possible to apply a unique indication signal and another indication signal if they can indicate to turn on the power source.

The LAN I/F 2609 is the interface means for executing various data communication with plural external devices (including the host computer and the information processing device). For example, a 10/100BASE-T connector can be adopted to the LAN I/F 2609.

The LANC 2610 controls the communication with the external devices through the LAN I/F 2609. Besides, it should be noted that the LANC 2610 comprises one portion (dotted-line portion) to which power is fed from an overnight power source unit 2615 and the other portion (solid-line portion) to which power is fed from a non-overnight power source unit 2616. The dotted-line portion of the LANC 2610 functions as the monitor unit for monitoring, in response to an inquiry externally transmitted through the LAN I/F 2609, which pattern data from among the plural kinds of pattern date is received. Then, if any one of the plural kinds of pattern data is confirmed through the monitoring by the monitor unit, the start signal is generated to return the control unit 2602 from the deep sleep state. Here, it should be noted that both the overnight power source unit 2615 and the non-overnight power source unit 2616 are included in the power source unit 2614. Incidentally, numeral 2618 denotes a power saving mode setting unit.

Here, the plural patterns are registered in an MAC ROM 2611 and read therefrom by the LANC 2610 in the initialization process. Incidentally, the overnight power may be fed to the MAC ROM 2611, and the pattern to be registered in the MAC ROM 2611 may be set by the user through the operation display unit 2608 or externally set from remotely located device such as the PC 2303 or 2304 through the network.

In addition, as the plural patterns, for example, (1) the pattern of an ARP (address resolution protocol) packet of which the target IP address is the IP address of own device, (2) the pattern of the multicast packet (of which the destinations are the plural specified devices) or the broadcast packet (of which the destination is the unspecified device) which has the pattern including the communication information of which the destination is the unspecified device or the plural specified devices and a unique identifier to be used for the power source control, and the like are cited.

Here, the communication information indicates the information to be used for the data communication of, for example, the Ethernet address of the destination of an Ethernet frame, the IP address of the destination of an IP frame, the port number of a transmission source, the port number of a destination, and the like.

Moreover, the unique identifier to be used for the power source control indicates the identifier which can be interpreted as the pattern such as, for example, a specific operation code, a specific character string or the like, to be used as the trigger for returning the device from the deep sleep state.

Incidentally, it should be noted that, in addition to the image forming device side, the host computer side comprises the generation unit (that is, an application, a communication module, a printer driver, or the like) for generating such a unique pattern.

Figure 27:
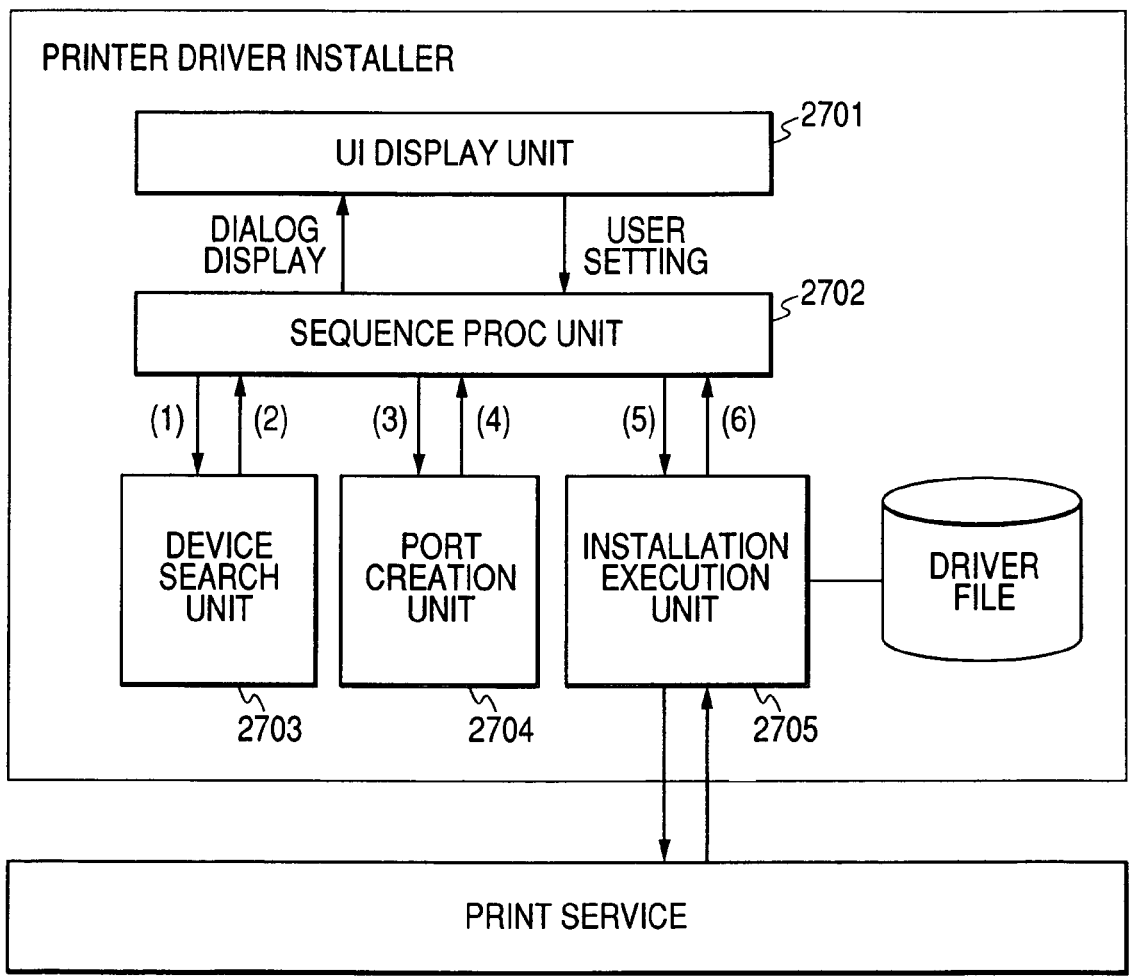
FIG. 27 is a block diagram for explaining the functional constitution and the processing operation by the installer according to the third embodiment.

Next, the functional constitution and the processing operation by the installer for setting up the logical printer to each of the PC's 2303 and 2304 will be explained hereinafter with reference to FIG. 27. Incidentally, the logical printer generically indicates the software module, the object, the setting value for the object which are all used to transmit the print data generated based on the application data in the PC to the print device on the network. For example, the Windows™ printer or the like is well known as a typical example. In the meantime, each of the PC's 2303 and 2304 comprises a UI (user interface) display unit 2701, a sequence processing unit 2702, a device (print device) search unit 2703, a port creation unit 2704, and an installation execution unit 2705.

In the installation, the following procedures are executed between the sequence processing unit 2702 and the device search unit 2703. More specifically, (1) a device search request (that is, confirmation of the existence of the device based on an SNMP (simple network management protocol)) is issued, and (2) the IP address and the printer name (and other device information (MIB) such as the MAC address, the location, etc.) of the device to be searched is returned. Besides, the additional information concerning the device to be searched may be acquired by using the MIB. Here, as the additional information, for example, the option information concerning the stapler implemented in the relevant printer, or the like can be used. In any case, the acquired information is reflected in the default setting of the logical printer in each of the PC's 2303 and 2304.

In addition, the following procedures are executed between the sequence processing unit 2702 and the port creation unit 2704. More specifically, (3) a port creation request corresponding to the IP address of the selected image forming device is issued, and (4) the result of the creation is notified.

In addition, the following procedures are executed between the sequence processing unit 2702 and the installation execution unit 2705. More specifically, (5) an installation request is issued, and (6) the result of the installation is notified.

Then, in the case where the search result based on the later-described search process is acquired by the PC 2303 (or 2304) and the printer to be installed is selected, the selected printer is actually set up in the PC 2303 (or 2304) by the known constitution shown in FIG. 27.

Figure 28:
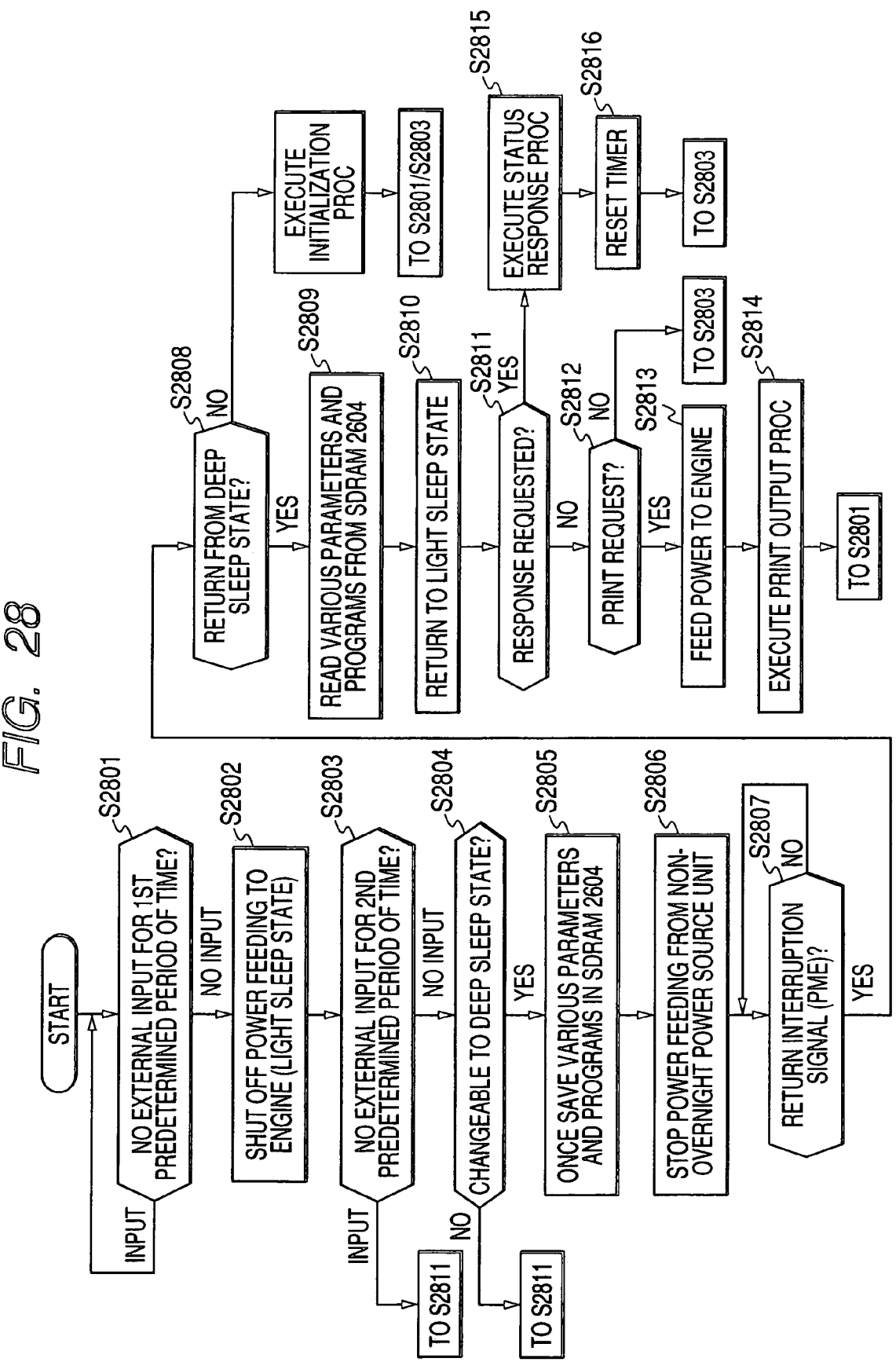
FIG. 28 is a flow chart showing the process by the control unit of the image processing control unit according to the third embodiment.

FIG. 28 is a flow chart showing the process by the control unit 2602 of the image processing control unit 2601. First, in a step S2801, it is judged whether or not there is an input from the outside for a first predetermined period of time (e.g., five minutes). Here, it should be noted that the input from the outside includes the print data (print request), an inquiry for the status (state) of the image forming device, and the like.

If it is judged in the step S2801 that there is the input from the outside, the judgment in the step S2801 is repeated until the first predetermined period of time elapses without any input. Incidentally, the judgment process in the step S2801 may actually be equivalent to the process of monitoring occurrence of an event, that is, the process of monitoring the event which occurs in the case where the first predetermined period of time elapses.

Meanwhile, if it is judged in the step S2801 that there is no input from the outside, the flow advances to a step S2802 to control or suppress the power feeding to the printer engine. In such a case, it is also possible to interrupt the power feeding to the printer engine or lower the power feeding to the extent capable of maintaining the afterheat of the printer engine. Here, it should be noted that the power state achieved in the step S2802 is called the light sleep state. Incidentally, in addition to the above judged result, if it is judged in the step S2801 that a command for forcedly change the state to the light sleep state is generated by the operation display unit 2608 or the expansion I/F 2612, the flow also advances to the step S2802. That is, even in such a case, it is possible to apply the above various conditions.

Then, in a step S2803, it is further judged whether or not there is an input from the outside for a second predetermined period of time (e.g., further five minutes after the first predetermined period of time elapsed). Here, it should be noted that the input from the outside includes the data pattern for returning the device from the deep sleep state, requests of the various statuses (states) of the image forming device, the print data, an indication input through the operation display unit 2608, and the like.

If it is judged in the step S2803 that there is no input from the outside, the flow advances to a step S2804 to further judge whether or not it is possible to change the state to the deep sleep state possible to interrupt the power feeding to the printer engine or lower the power feeding to the extent capable of maintaining the afterheat of the printer engine. Here, it should be noted that the power state achieved in the step S2802 is called the light sleep state. Incidentally, in addition to the above judged result, if it is judged in the step S2803 that a command for forcedly change the state to the deep sleep state is generated by the operation display unit 2608 or the expansion I/F 2612, the flow also advances to the step S2804. That is, even in such a case, it is possible to apply the above various conditions.

Then, if it is judged in the step S2804 that it is possible to change the state to the deep sleep state, the initialization data and the setting data read by the image processing control unit 2601 (or the control unit 2602) in the initialization process are once saved in the SDRAM 2604.

After the relevant data were saved in the SDRAM 2604, in a step S2806, the power feeding from the non-overnight power source unit 2616 is interrupted. More specifically, a switching signal is transferred to the power source SW circuit 2617 to interrupt the power feeding from the non-overnight power source unit 2616, and the power source SW circuit 2617 operates to stop the power feeding from the non-overnight power source unit 2616, whereby the image processing control unit 2601 comes into the deep sleep state of which the standby power is less than 1 W. Moreover, the power saving for stopping the function of, in addition to the control unit 2606, the solid-line portion of the LANC 2610 (that is, the communication control unit for transferring the print data and the like transmitted from the outside to the control unit 2602), whereby it is possible to achieve further power saving in the communication unit.

In a step S2807, it is monitored to judge whether or not the event indicating to return from the deep sleep state is input. More specifically, when the PME shown in FIG. 26 is input to the power source SW circuit 2617, it is judged in the step S2807 that the relevant event is input (YES). Incidentally, it should be noted that the relevant event monitoring process as in the step S2807 can be achieved by the hardware constitution such as the power source SW circuit 2617 or by software.

If it is judged in the step S2807 that the relevant event is input (YES), the flow advances to a step S2808 to further judge whether or not the return is the return from the deep sleep state. More specifically, in the step S2808, the change history to the deep sleep state is held as the flag in a predetermined memory region, and the power source SW circuit 2617 executes the relevant judgment as referring to the held flag. That is, if the flag does not stand, it implies that the main power source is operated from the off state to the on state. In that case, the initialization process is executed to the main body of the print device based on the setting data read from the nonvolatile storage means (HDD 2603), and thereafter the flow advances to the step S2801 or S2803.

If it is judged "YES" in the step S2808, the flow advances to a step S2809. In the step S2809, the various parameters and the main programs saved in the SDRAM 2604 in the step S2805 are read by the control unit 2602.

After then, in a step S2810, the power state is returned to the light sleep state. In the light sleep state, at least the printer engine can communicate with the external devices through the LAN, a USB and the like without actually operating it unlike the print operation. At that time, the power is fed also to the solid-line portion of the LANC 2610 (that is, the communication control unit for transferring the various data externally transmitted to the control unit 2602).

Incidentally, it should be noted that the return to the light sleep state in the step S2810 corresponds to the change to the state of receiving the print data and the state capable of responding to the various inquiries externally transmitted to the print device. Then, after the power state was returned to the light sleep state, the processes in a step S2811 and the following steps are executed according to the various commands transmitted from the external devices. Alternatively, it is also possible to add the commands of the status (state) request, the search response request and the like to the later-described unique frame pattern.

Then, in the step S2811, it is judged whether or not the response concerning the state of the image forming device is received from the external device. If it is judged that the response is received (YES), then the flow advances to a step S2815 to execute the statue (state) response process. Then, in a step S2816, the timer is reset, and the flow returns to the step S2803.

Incidentally, it occasionally takes several seconds in the case where the power state returns from the deep sleep state to the light sleep state in accordance with the reading speed and the read data amount of the SDRAM. In such a case, it may be thought to be unable to quickly respond to the externally transmitted request. However, even in such a case, by causing the external device to retry the request, the status (state) response request can resultingly be transmitted from the image forming device to the external device.

In the meanwhile, if it is judged in the step S2811 that the response is not received (NO), the flow advances to a step S2812 to further judged whether or not the print request is received. If it is judged that the print request is not received (NO), the flow returns to the step S2803.

Meanwhile, if it is judged in the step S2812 that the print request is received (YES), the flow advances to a step S2813 to execute the power control so as to turn on the power source of the printer engine. Then, in a step S2814, various print output processes are executed. After the various print output processes in the step S2814 ended, the flow returns to the step S2801.

Subsequently, the monitoring process from the deep sleep state to the generation of the return signal will be explained hereinafter with reference to FIG. 29. Here, the relevant monitoring process includes the monitoring process by the monitor unit of the LANC 2610 for monitoring which pattern data from among the plural kinds of pattern date is received. Incidentally, it should be noted that the processes in the flow chart of FIG. 29 may be executed in synchronism with the process in the step S2807 in the flow chart of FIG. 28, or may be executed in parallel as a routine independently of the processes in the flow chart of FIG. 28.

Figure 29:
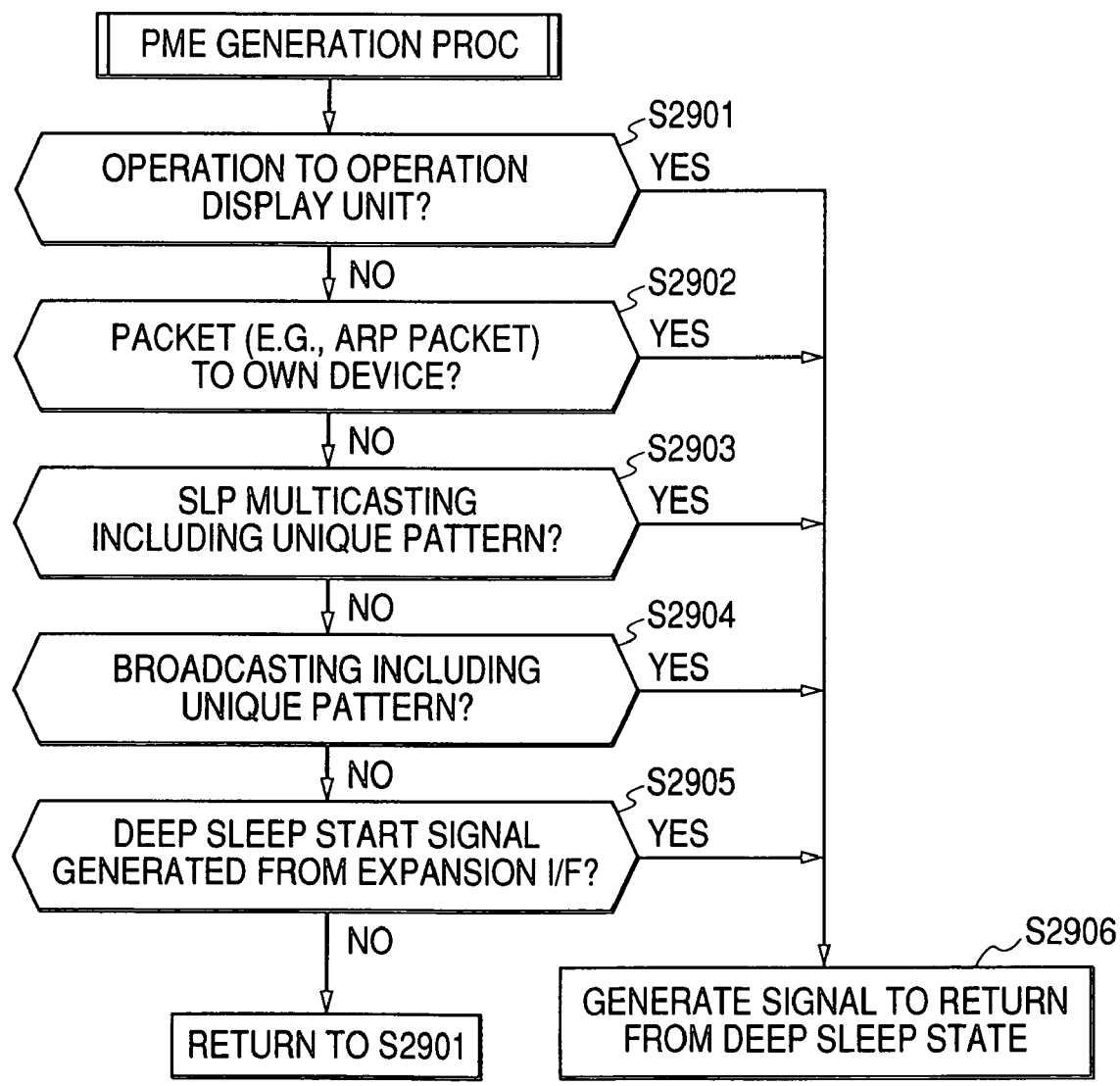
FIG. 29 is a flow chart showing the monitoring process from the deep sleep state to the generation of a return signal, according to the third embodiment.

The process in each step of the flow chart shown in FIG. 29 is executed in the case where the image processing control unit 2601 is in the deep sleep state, the process in a step S2901 is executed according to the operation (or handling) to the operation display unit 2608, and the processes in steps S2902 to S2905 correspond to the processes to be executed by the LANC 2610. Then, if the signal is generated in the process in a step S2906, it is judged "YES" in the step S2807 of FIG. 28.

More specifically, it is first judged in the step S2901 whether or not some kind or another operation is executed to the operation display unit 2608. Here, as the operation to be executed to the operation display unit 2608, it is possible to include the depression of the button disposed on the operation display unit 2608 and also include the touch to the LCD screen if the operation display unit 2608 is the LCD panel.

If it is judged in the step S2901 that the operation is executed to the operation display unit 2608 (YES), the return signal (shown as PME in FIG. 26) for returning from the deep sleep state is generated (step S2906).

Then, it is judged in the step S2902 whether or not the packet of which the destination is the own device is received. Here, in the judgment of packet reception, it is possible to adopt any of the IP address, the MAC address, the device serial number, the device name. Moreover, the ARP packet can be adopted as the packet of which the destination is the own device.

Subsequently, it is judged in the step S2903 whether or not the SLP packet including the unique pattern is received. Here, the unique pattern may be described at the expansion portion in the SLP packet, and any data to which the unique pattern can be embedded can be used appropriately as the data to be processed in the step S2903.

After then, it is judged in the step S2904 whether or not the broadcast packet or the broadcast data which includes the unique pattern is received. Also, in that case, any broadcast packet or broadcast data to which the unique pattern can be embedded can be used appropriately as the data to be processed in the step S2904.

Subsequently, it is judged in the step S2905 whether or not the command to change the power state to the light sleep state is received from the expansion I/F 2612.

Incidentally, if it is judged "YES" in each of the steps S2902 to S2905, the return signal (shown as PME in FIG. 26) for returning from the deep sleep state is generated (step S2906).

As above, according to the flow chart shown in FIG. 29, in the case where the inquiry is transmitted from the outside, it is possible to monitor the data reception of any one of the plural kinds of patterns. Here, it should be noted that the plural kinds of patterns include the pattern which includes the communication information to be transmitted to the unspecified device (step S2904) or the plural specified devices (step S2903) and the identifiers to be used to control the power source. Besides, in the case where the data of any pattern is received through the LAN I/F 2609 and the LANC 2610, it is possible to feed the power to the control unit 2602.

FIG. 30 is a diagram for explaining the SLP multicast packet which is an example of the data pattern which includes the communication information to be transmitted to the unspecified device or the plural specified devices and the identifiers to be used to control the power source. In other words, FIG. 30 shows an example of the pattern which is monitored by the LANC 2610. In FIG. 30, star-shaped parameter items 2001 to 3007 indicate that the relevant packet is the service request packet of SLP (Service Location Protocol) and the relevant address is the plural specified devices.

In particular, it is possible based on the destination port number 3006 to discriminate that the packet is the SLP packet. However, the pattern which enables to discriminate that the packet is the SLP packet may be included in the unique frame pattern 3007. The unique frame pattern 3007 indicates the unique frame pattern which acts as the identifier to be used in the power source control in the print device. Further, the unique frame pattern 3007 can be arbitrarily set on the side of providing the print device or the side of using the print device. Moreover, the unique frame pattern 3007 can be used to return in a lump the device group supposed by the side of providing the print device or the side of using the print device from the deep sleep state. Thus, only the necessary device can be searched from the network, whereby the network search at the time of the setup of the printer driver can be achieved. Incidentally, although the unique frame pattern 3007 shown in FIG. 30 includes only one item, it may include plural items.

Besides, by multicasting the inquiry based on the data as shown in FIG. 30 to the plural print devices on the network, the external device can start in a lump the plural print devices capable of interpreting the unique frame pattern 3007 with a small operation.

Incidentally, it should be noted that the data pattern which includes the communication information to be transmitted to the plural specified devices and the identifiers to be used to control the power source is not limited to the pattern example of the SLP packet as shown in FIG. 30. That is, the relevant pattern may include a unique identifier (unique frame pattern) which is uniquely created. Besides, the relevant pattern may include, in addition to the item for discriminating the SLP packet (i.e., the communication information to be transmitted to the plural specified devices), an identifier to be used for the power source control. For example, it is possible to set an imaginary value to "TRANSIMISSION SIDE PORT NUMBER" shown in FIG. 30, and thus return the print device from the deep sleep state on the basis of the interpretation of the set imaginary value.

Moreover, in the example of FIG. 30, as the destination IP address, the multicast address which includes the plural specified devices as its addresses is adopted. In the meanwhile, if it includes the unspecified device as the address, the destination IP address only has to be set as the broadcast address (ff:ff:ff:ff).

Figure 31:
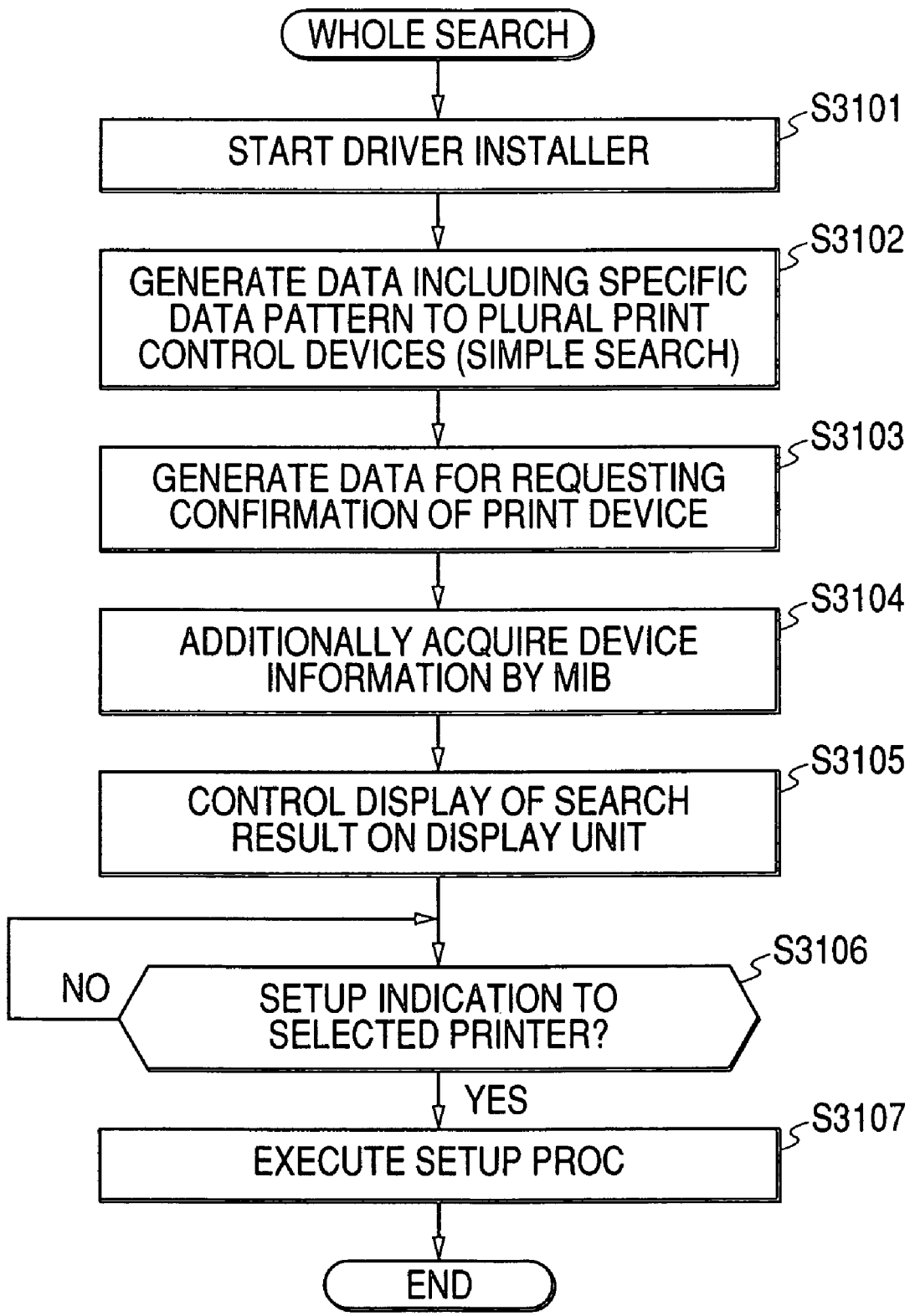
FIG. 31 is a flow chart showing the whole search process according to the third embodiment.

Subsequently, the whole search process in the PC 2303 (or 2304) shown in FIG. 23 will be explained with reference to FIG. 31. Incidentally, the flow chart shown in FIG. 31 shows the process which starts the image forming device of which the LANC 2610 shown in FIG. 26 previously stores (registers) the specific data pattern, and acquires the pattern as the result of search. Initially, in a step S3101, the driver installer starts the operation. Here, it should be noted that the driver installer is equivalent to the block shown in FIG. 27.

Then, if the setup for the print device is indicated by the user through the setting screen of the driver installer, the flow advances to a step S3102 to generate the data including the specific data pattern to the plural print devices disposed on the network. Here, the process in the step S3102 may be executed in conjunction with the process in the step S3101, or may be executed in response to the user's indication. Besides, the specific data pattern may be the SNMP broadcast packet or the like. In that case, the data pattern of the SNMP broadcast packet is registered in the LANC 2610, whereby the image forming device can recognize the SNMP broadcast packet issued and generated onto the network.

Next, in a step S3103, the data for requesting the information indicating the existence of the printer device is generated and transmitted to the print devices on the network. For example, it only has to generate and transmit the printer MIB for requesting the printer name and the IP address, by the SNMP broadcasting.

Then, the print device which can respond to the printer MIB generated in the step S3103 corresponds to the print device which started its operation from the deep sleep state in response to the data generated in the step S3102 and the print device which has been previously in the state capable of executing communication.

Next, in a step S3104, as well as the step S3103, the printer MIB which acquires the further detailed information of the print device's is generated and transmitted to the print devices on the network by, for example, the SNMP broadcasting. Here, the detailed information of the print device indicates, for example, the paper sizes which are associated with the paper feeding trays, or the like. Incidentally, the inquiry content in the step S3104 may be included in the step S3103 so as to omit the process in the step S3104.

Then, in a step S3105, the search results which are recognized according to the responses from the single print device or the plural print devices with respect to the inquiries in the steps S3103 and S3104 are displayed on the display unit of the PC 2303 (or 2304) as the list of the print devices.

Subsequently, it is judged in a step S3106 whether or not the specific print device included in the list of the print devices is indicated to execute the setup to the information processing device. If it is judged "YES" in the step S3106, the flow advances to a step S3107 to execute the setup on the basis of the information acquired from the print devices in the steps S3103 and S3104. Here, it should be noted that the known constitution as shown in FIG. 27 may be used in the setup process, whereby the detailed explanation thereof will be omitted for simplification.

As described above, according to the processes as shown in the flow chart of FIG. 31, even if the print device comes into the deep sleep state as in the present embodiment and thus cannot respond to the reception of print jobs, the externally transmitted inquiries for the print device, and the like, it is possible to cause the information processing device to display the list of the print devices. Thus, it enables to execute the setup of the print device which is intended to be used by the user. Therefore, with respect to the setup of the print device and the like in the information processing device, it is possible to achieve the constitution which can improve the power saving efficiency of the print device and respond to the device search, and does not lower the usability.

Figure 32:
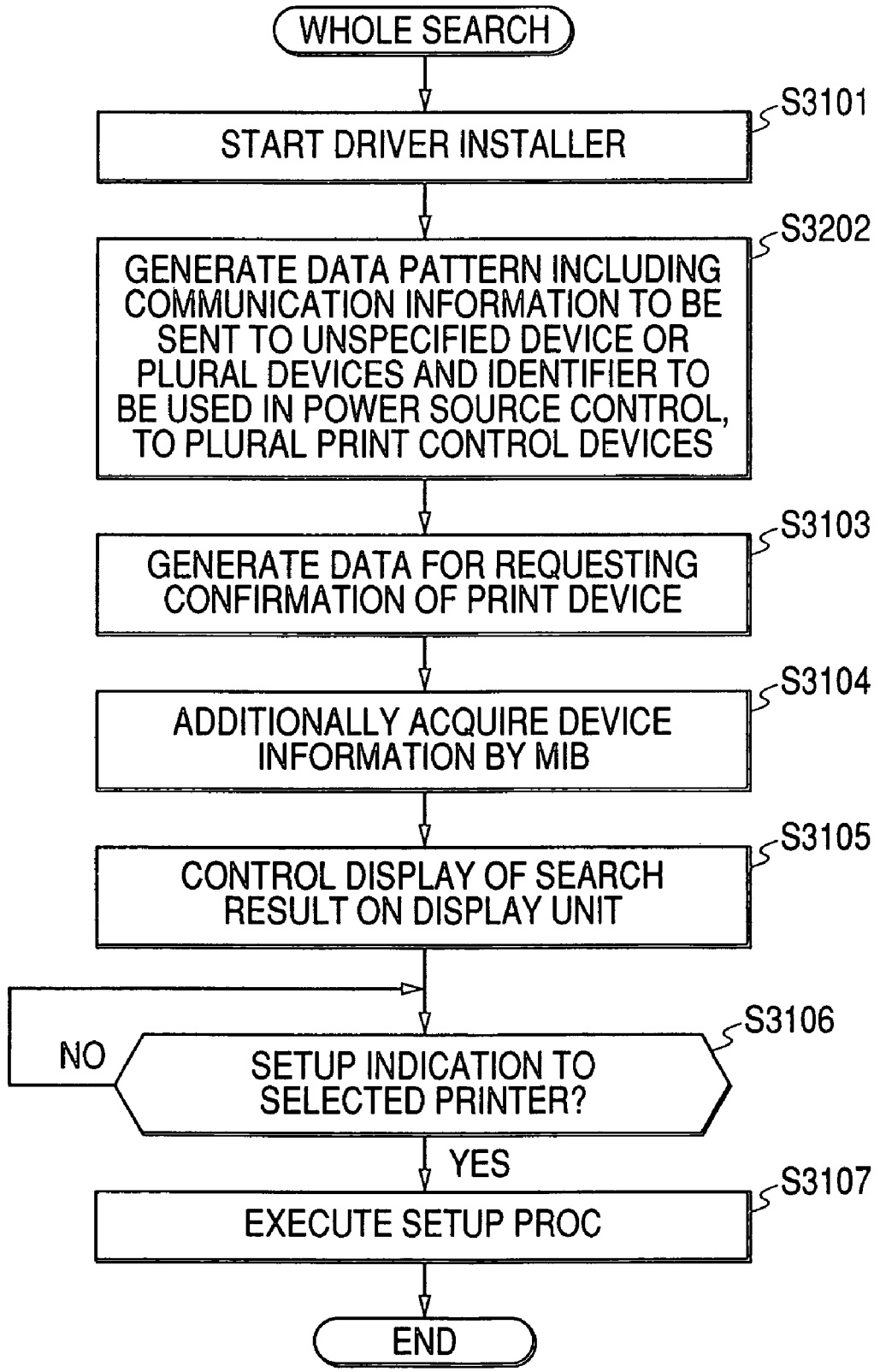
FIG. 32 is a flow chart showing another search process according to the third embodiment.

Subsequently, the whole search process, different from the process in the flow chart of FIG. 31, in the PC 2303 (or 2304) shown in FIG. 23 will be explained with reference to FIG. 32. Here, although the SNMP broadcast packet or the like is used as the specific data pattern in FIG. 31, the SLP multicast packet which is the example of the data pattern which includes the communication information to be transmitted to the unspecified device or the plural specified devices and the identifiers to be used to control the power source is used as the specific data pattern in FIG. 32. Incidentally, in the flow chart of FIG. 32, the processes same as those in the flow chart of FIG. 31 are respectively denoted by the corresponding same symbols, and the detail explanation thereof will be omitted.

In a step S3202, the data pattern which includes the communication information to be transmitted to the unspecified device or the plural specified devices and the identifiers to be used to control the power source is issued or generated to the plural print devices on the network. In that case, the print device which previously registers in the LANC the data pattern including the communication information and the identifier to be used in the power source control returns from the deep sleep state to the state capable of executing the communication in response to the data generated in the step S3202. The above-explained pattern shown in FIG. 30 corresponds to an example of the data generated in the step S3202.

As above, by using the data pattern which includes the communication information to be transmitted to the unspecified device or the plural specified devices and the identifiers to be used to control the power source, it is possible to freely set the rule for returning the print device from the deep sleep state, as compared with the case of using the SNMP broadcast packet or the like. As a result, the condition for returning the print device from the deep sleep state can be limited, whereby it is possible to eliminate the inconvenience of needlessly starting the operation of the print device in response to the externally input access, and it is thus possible to promote the power saving.

Figure 33:
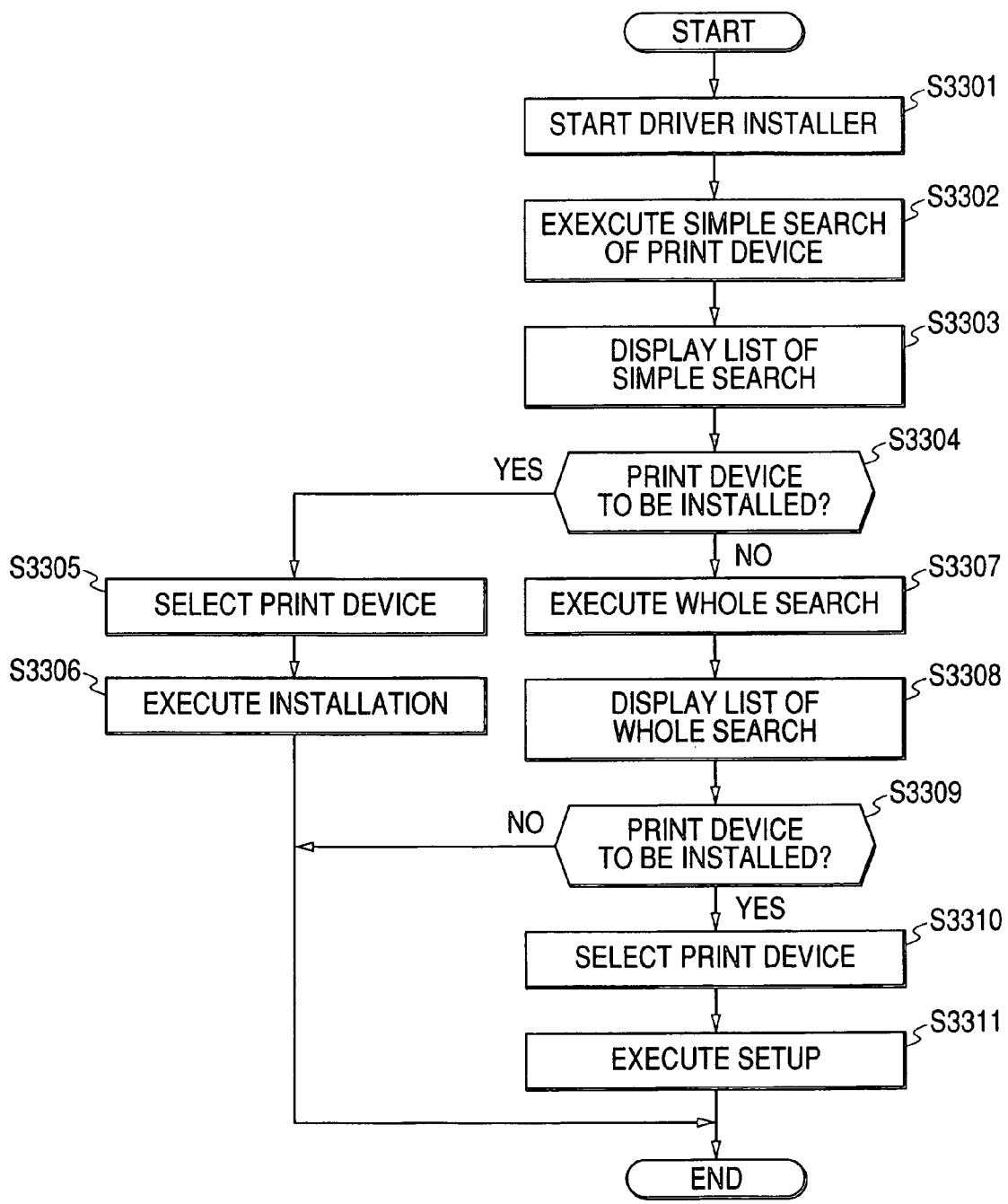
FIG. 33 is a flow chart showing the search process according to the third embodiment.

FIG. 33 is a flow chart showing the search process in the PC 2303 (or 2304) according to the present embodiment. In the print system which executes the print process by transmitting and receiving the information through the network as shown in FIG. 23, when the printer driver is installed in a new personal computer (information processing device), the print devices on the network are first searched from the information processing device, and then the desired print devices are selected from the displayed print devices searched, and then the printer driver is actually installed.

In the present embodiment, in case of searching the print devices, the simple search capable of searching the print device in the state that the communication unit thereof can execute the status (state) response in the power state of at least the normal mode is first executed. Then, based on the displayed result concerning the searched print devices, it causes the user to select whether or not to execute the whole search capable of searching the print devices in the power saving mode (deep sleep state).

More specifically, the simple search will be explained hereinafter. The simple search indicates the broadcast search packet or the like which does not include the pattern for returning the print device registered in the MAC ROM 2611 of FIG. 26 from the deep sleep state. For example, a PING which is the program for confirming whether or not the computer on the network is in a communicable state is used as the broadcast search packet (simple search). If the power source state of the print device does not come into the deep sleep state, the typical print devices can respond to the simple search. For example, the print device can execute the search (step S3103) without issuing (or generating) the specific data pattern (step S3102) in the flow chart of FIG. 31 and issuing (or generating) the data pattern (step S3202) which includes the communication information to be transmitted to the unspecified device or the plural specified devices and the identifiers to be used to control the power source in the flow chart of FIG. 32.

Initially, in order to use the print device connected on the network, it starts up the driver installer on the information processing device to install the printer driver in the information processing device (step S3301).

Then, the started-up installer transmits the information packet which can be searched by the print devices of at least the normal mode such as the broadcasting (ARP packet) or the like to the plural print devices connected on the network, thereby executing the simple search (step S3302) Then, the installer displays the list of thus acquired print devices to which the printer driver can be installed (step S3303).

FIG. 34 is a diagram showing a display example of the driver-installable print devices which are acquired as a result of the simple search. Here, in the relevant list, the names of the print devices, the locations of thereof, the model names thereof, and the like are displayed. Thus, it is judged by the user whether or not the print device to which the printer driver should be installed exists in the relevant list (step S3304). If it is judged that the print device to which the printer driver should be installed exists, the relevant print device is selected in the displayed list (step S3305), and the printer driver is actually installed to the selected print device (step S3306).

Meanwhile, if it is judged in the step S3304 that the print device to which the printer driver should be installed does not exist in the displayed list, there is a possibility that the simple search is impossible because the print devices connected on the network are all in the power saving mode (deep sleep state). Therefore, in that case, the whole search by which even the print device in the power saving mode can be searched is executed (step S3307). Then, it displays the list of thus acquired print devices to which the printer driver can be installed (step S3308). Here, it should be noted that, as shown in FIGS. 31 and 32, the whole search is the operation which forcedly causes the print devices being in the power saving mode come into the normal mode so as to be able to search all the print devices.

FIG. 35 is a diagram showing a display example of the driver-installable print devices which are acquired as a result of the whole search. Here, in the relevant list, it is judged by the user whether or not the print device to which the printer driver should be installed exists (step S3309). If it is judged that the print device to which the printer driver should be installed exists, the relevant print device is selected in the displayed list (step S3310), and the logical printer corresponding to the print device indicated from the searched result is set up (step S3311). Here, it is assumed that such setup includes the installation of printer driver, the setting of output port, the default setting of logical printer, the reflection of print device mounting information configurated from the print device on the logical printer, and the like, as explained in FIG. 27.

Meanwhile, if it is judged in the step S3309 that the print device to which the printer driver should be installed does not exist in the displayed list, the installation of the printer driver is cancelled.

In the present embodiment, it is judged based on the result of the simple search whether or not to execute the whole search. However, the present invention is not limited to this. That is, it is also possible to selectively execute either the simple search or the whole search. In that case, as a result of the simple search, if the print device to which the printer driver can be installed does not exist and the reason why the power source is not turned on is obvious, it is possible to again execute the simple search after turning on the power source. By doing so, it is possible to install the printer driver without executing the whole search.

In that case, for example, as shown in a search list 3601 of FIG. 36, when the indication is input through a whole search indication button 3605 or a simple search indication button 3606, either the whole search or the simple search is selectively executed. Then, the searched result is displayed on a display portion 3602 in either the whole search and the simple search. Subsequently, the specific print device is selected from the searched result through a printer selection indication button 3603, and the setup process is executed if the indication is input through an OK indication button 3604.

Other Embodiments

The present invention may be applied to the system constituted by the plural devices, or to the apparatus comprising the single device.

Incidentally, in the above embodiments, the transmission range of the search packet is the same as the transmission range of the wakeup packet. However, the present invention is tot limited to this. That is, in the present invention, the transmission range of the wakeup packet only has to be wider than the transmission range of the search packet.

Moreover, in the above embodiments, the computer device searches the image processing device. However, the present invention is not limited to this. That is, the present invention is also applicable to a case where the image processing device searches the image processing devices.

Further, it is needless to say that the present invention can be applied to a case where a storage medium storing therein program codes of software to realize the functions of the above embodiments is supplied to a system or an apparatus, and thus a computer (or CPU or MPU) in the system or the apparatus reads and executes the program codes stored in the medium.

In this case, the program codes themselves read out of the storage medium realize the functions of the above embodiments. Therefore, the storage medium storing these program codes constitutes the present invention. As the storage medium from which the program codes are supplied, for example, a Floppy™ disk, a hard disk, an optical disk, a magnetooptical disk, a CD-ROM, a CD-R, a magnetic tape, a nonvolatile memory card, a ROM, downloading through the network, and the like can be used.

Further, it is needless to say that the present invention includes not only a case where the functions of the above embodiments are realized by executing the program codes read by the computer, but also a case where an OS (operating system) or the like running on the computer performs a part or all of the actual processes on the basis of indications of the program codes and thus the functions of the above embodiments are realized by these processes.

Furthermore, it is needless to say that the present invention also includes a case where, after the program codes read out of the storage medium are written into a function expansion board inserted in the computer or a memory in a function expansion unit connected to the computer, a CPU or the like provided in the function expansion board or the function expansion unit executes a part or all of the actual processes on the basis of the instructions of the program codes, and thus the functions of the above embodiments are realized by such the processes.

This application claims priority from Japanese Patent Application No. 2004-218822 filed Jul. 27, 2004, Japanese Patent Application No. 2004-220026 filed Jul. 28, 2004 which are hereby incorporated by reference herein.

What is claimed is:

1. An information processing device which can communicate with an image processing device on a network, comprising:
a first transmission unit configured to transmit a request for changing a power saving state of the image processing device on the network to a normal state;
a second transmission unit configured to transmit a search request for searching the image processing device;
a selection unit configured to select either one of a first search operation of transmitting the search request by said second transmission unit after transmitting the request by said first transmission unit, and a second operation of transmitting the search request by said second transmission unit without transmitting the request by said first transmission unit;
and a control unit configured to control said first transmission unit or said second transmission unit on the basis of the search operation selected by said selection unit.

2. An information processing device according to claim 1, further comprising a designation unit configured to designate a transmission range of the search request transmitted by said second transmission unit, wherein the transmission range is designated by a value of TTL (Time To Live).

3. An information processing device according to claim 1, further comprising a reception unit configured to receive a response to the search request from the image processing device which satisfies the search request.

4. An information processing device according to claim 3, further comprising a display unit configured to display information which represents the image processing device satisfying the search request, based on the response received by said reception unit.

5. An information processing device according to claim 3, wherein the search request includes a setting value set by a user, and said reception unit receives the response from the image processing device which satisfies the setting value.

6. A control method for an information processing device which can communicate with an image processing device on a network, comprising:
a first transmission step of transmitting a request for changing a power saving state of the image processing device on the network to a normal state;
a second transmission step of transmitting a search request for searching the image processing device;
a selection step of selecting either one of a first search method of transmitting the search request in said second transmission step after transmitting the request in said first transmission step, and a second method of transmitting the search request in said second transmission step without transmitting the request in said first transmission step; and an execution step of executing said first transmission step or said second transmission step on the basis of the search method selected in said selection step.

7. A control method according to claim 6, further comprising a designation step of designating a transmission range of the search request transmitted in said second transmission step, wherein the transmission range is designated by a value of TTL (Time To Live).

8. A control method according to claim 6, further comprising a reception step of receiving a response to the search request from the image processing device which satisfies the search request.

9. A control method according to claim 8, further comprising a display step of causing a display unit to display information which represents the image processing device satisfying the search request, based on the response received in said reception step.

10. A control method according to claim 8, wherein the search request includes a setting value set by a user, and said reception step is adapted to receive the response from the image processing device which satisfies the setting value.

* * * * *